United States Patent
Yu et al.

(10) Patent No.: US 10,491,512 B2
(45) Date of Patent: Nov. 26, 2019

(54) SUPPORTING PACKET QUERY-RESPONSE TRANSACTIONS AT LOWER LAYER

(71) Applicant: QUALCOMM Incorporated, San Diego, CA (US)

(72) Inventors: Yu-Ting Yu, Somerset, NJ (US); Vincent Douglas Park, Budd Lake, NJ (US); Zhibin Wu, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 14/718,047

(22) Filed: May 20, 2015

(65) Prior Publication Data

US 2016/0344619 A1    Nov. 24, 2016

(51) Int. Cl.
*H04L 12/721* (2013.01)
*H04L 12/741* (2013.01)
*H04L 12/709* (2013.01)
*H04L 29/12* (2006.01)
*H04L 29/08* (2006.01)
*H04L 12/801* (2013.01)
*H04L 29/06* (2006.01)
*H04W 74/08* (2009.01)

(52) U.S. Cl.
CPC ............ *H04L 45/26* (2013.01); *H04L 45/245* (2013.01); *H04L 45/74* (2013.01); *H04L 47/12* (2013.01); *H04L 61/6022* (2013.01); *H04L 69/22* (2013.01); *H04L 69/321* (2013.01); *H04W 74/08* (2013.01)

(58) Field of Classification Search
None
See application file for complete search history.

(56) References Cited

U.S. PATENT DOCUMENTS

| | | | | |
|---|---|---|---|---|
| 5,519,704 A * | 5/1996 | Farinacci | ............ | H04L 12/1868 370/402 |
| 5,604,869 A * | 2/1997 | Mincher | ................ | H04W 4/00 370/445 |
| 6,457,059 B1 * | 9/2002 | Kobayashi | ............ | H04L 12/185 709/242 |
| 6,807,160 B1 * | 10/2004 | Laroia | ............... | H04W 72/1278 370/329 |

(Continued)

OTHER PUBLICATIONS

International Search Report and Written Opinion—PCT/US2016/028309—ISA/EPO—dated Jul. 25, 2016.

*Primary Examiner* — Steve R Young
(74) *Attorney, Agent, or Firm* — Arent Fox LLP; Kevin M. Donnelly

(57) ABSTRACT

In an aspect of the disclosure, a method, a computer program product, and an apparatus are provided. The apparatus may be a first node. The first node receives a packet from a second node. The first node determines that the received packet is a query packet, the query packet including information indicating at least a transaction identifier. The first node determines a transaction type based on the information included in the query packet. The first node determines whether to transmit a response packet based on at least one of the transaction type or a transaction identifier at at least one of a PHY layer, a MAC layer, or a link layer. The first node transmits a response packet to the second node in response to determining to transmit the response.

19 Claims, 14 Drawing Sheets

(56) References Cited

U.S. PATENT DOCUMENTS

| | | | | |
|---|---|---|---|---|
| 6,865,160 | B1* | 3/2005 | Bare | H04L 12/185 370/256 |
| 7,116,661 | B2 | 10/2006 | Patton | |
| 8,112,781 | B2* | 2/2012 | Schlack | H04L 67/322 370/395.41 |
| 8,250,063 | B2 | 8/2012 | Dutta et al. | |
| 8,577,980 | B2* | 11/2013 | Fabre | G06Q 10/107 709/206 |
| 2002/0196789 | A1* | 12/2002 | Patton | H04L 1/188 370/400 |
| 2005/0044174 | A1 | 2/2005 | Landin et al. | |
| 2005/0094632 | A1* | 5/2005 | Hebsgaard | H04L 1/0083 370/389 |
| 2008/0320151 | A1* | 12/2008 | McCanne | H03M 7/30 709/228 |
| 2010/0232354 | A1 | 9/2010 | Patil et al. | |
| 2012/0226822 | A1 | 9/2012 | Norair | |
| 2013/0142094 | A1 | 6/2013 | Homchaudhuri et al. | |
| 2013/0185427 | A1* | 7/2013 | Sterling | G06Q 10/06 709/225 |
| 2014/0105196 | A1 | 4/2014 | Seok | |
| 2014/0242985 | A1* | 8/2014 | Kneckt | H04W 40/14 455/434 |
| 2014/0330985 | A1 | 11/2014 | Wong et al. | |
| 2015/0009858 | A1* | 1/2015 | Jung | H04W 48/12 370/254 |
| 2015/0029950 | A1* | 1/2015 | Rath | H04W 72/0413 370/329 |
| 2017/0034064 | A1* | 2/2017 | Everhart | H04L 47/25 |

* cited by examiner

SUPPORTING PACKET QUERY-RESPONSE TRANSACTIONS AT LOWER LAYER

BACKGROUND

Field

The present disclosure relates generally to communication systems, and more particularly, to techniques of supporting packet query-response transactions among communication devices at a lower layer.

Background

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In certain configurations, pull-oriented transactions such as query-response transactions among devices are encapsulated in the syntax of higher-layer messages (e.g., hypertext transfer protocol (HTTP) requests and HTTP responses) and are transparent to lower layers, which for example may be a physical (PHY) layer, a media access control (MAC) layer, and/or a link layer. Accordingly, the lower layers of the devices do not recognize such pull-oriented transactions at upper layers, which may be a user datagram protocol (UDP) layer, a transmission control protocol layer, and/or an Internet protocol (IP) layer. The lower layers do not have the capabilities to distinguish such upper layer transactions and to optimize network performance utilizing such upper layer pull-oriented transactions. Thus, there is a need for improved handling of query-response transactions at the lower layers.

SUMMARY

In an aspect of the disclosure, a method, a computer program product, and an apparatus are provided. The apparatus may be a first node. The first node receives a packet from a second node. The first node determines that the received packet is a query packet, the query packet including information indicating at least a transaction identifier. The first node determines a transaction type based on the information included in the query packet. The first node determines whether to transmit a response packet based on at least one of the transaction type or a transaction identifier at at least one of a PHY layer, a MAC layer, or a link layer. The first node transmits a response packet to the second node in response to determining to transmit the response.

In another aspect of the disclosure, a method, a computer program product, and an apparatus are provided. The apparatus may be a first node. The first node receives, from an upper layer and at at least one of a PHY layer, a MAC layer, or a link layer, a transaction type and data associated with the transaction type. The first node obtains a transaction identifier for the data. The first node prepares, at the one of the PHY layer, the MAC layer, or the link layer, a query packet to include the transaction type, the data, a packet type, and the transaction identifier. The packet type indicates that the query packet is a query, wherein the transaction type indicates one of (a) the query packet requests a response from one node, (b) the query packet requests a response from any nodes of a set of nodes, (c) the query packet requests a response from any M nodes of N nodes where N is greater than M, or (d) the query packet requests a response from each node of a set of nodes. The first node transmits the query packet.

In another aspect of the disclosure, a method, a computer program product, and an apparatus are provided. The apparatus may be a first node. The first node receives a query packet from a second node. The query packet may include: (a) an indication of a first transaction with which the query packet is associated, (b) an indication that M response packets associated with the first transaction is requested by the second node, M being an integer greater than 0, (c) an indication of a time period allocated for transmitting the M response packets to the second node on a channel, and (d) an indication of at least one of a channel assignment mechanism or a contention mechanism to be used to allocate at least M time slots. The first node obtains a first time slot from the at least M time slots allocated in the indicated time period for accessing a channel in accordance with the indicated at least one of contention mechanism or channel assignment mechanism. The first node transmits, at the first time slot, a first response packet of the M response packets associated with the first transaction to the second node on the channel.

DETAILED DESCRIPTION

Figure 1:
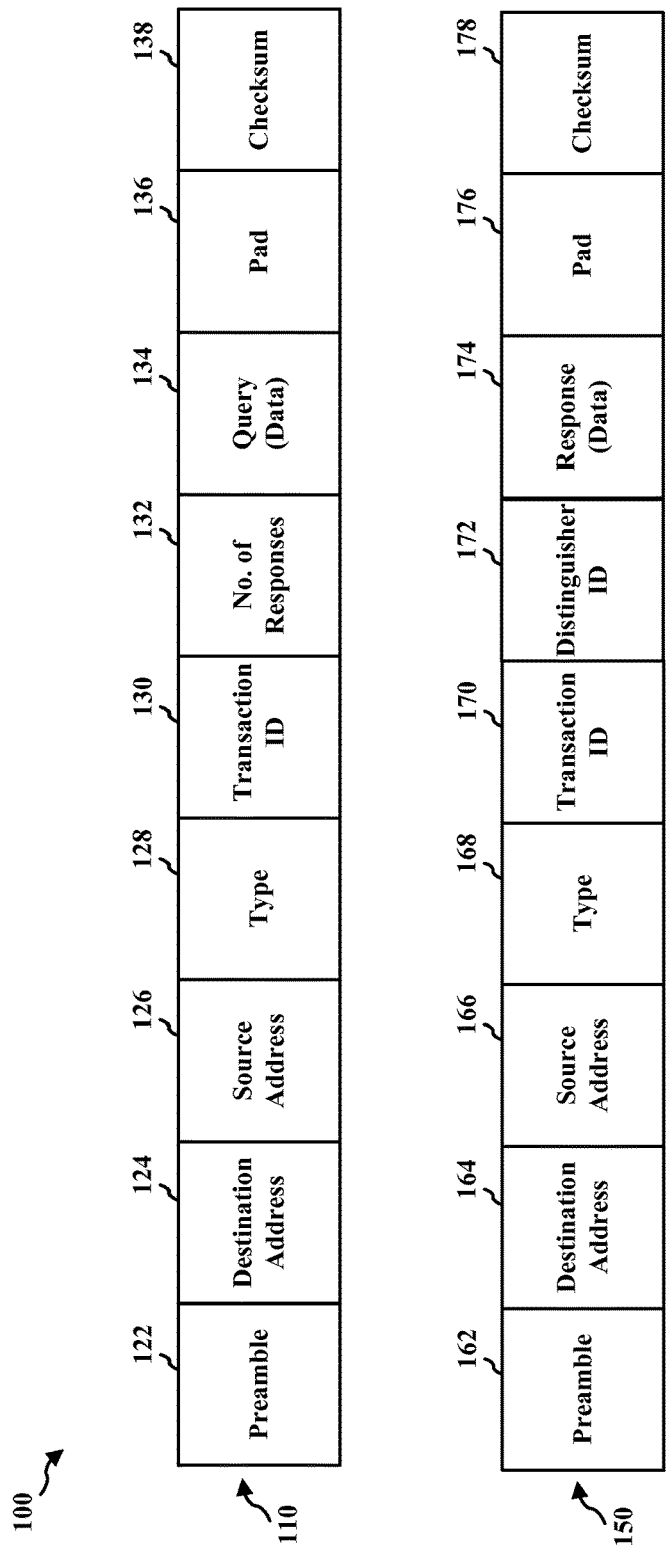
FIG. 1 is a diagram illustrating PHY/MAC/Link layer packets (frames) supporting query-response transactions.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the novel systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to an Institute of Electrical and Electronics Engineers (IEEE) 802.11 protocol using orthogonal frequency-division multiplexing (OFDM), direct sequence spread spectrum (DSSS) communications, a combination of OFDM and DSSS communications, or other schemes. Implementations of the IEEE 802.11 protocol may be used for sensors, metering, and smart grid networks. Advantageously, aspects of certain devices implementing the IEEE 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA may also be used as an AP.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatus may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element.

As discussed supra, certain devices described herein may implement the IEEE 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g., for use with hotspots), or to implement machine-to-machine communications.

In certain configurations, pull-oriented transactions such as query-response transactions among devices are encapsulated in the syntax of higher-layer messages (e.g., HTTP requests and HTTP responses) and are transparent to lower layers (e.g., the PHY/MAC/Link layers). Accordingly, the lower layers of the devices do not recognize such upper layer (e.g., the UDP/TCP/IP layers) pull-oriented transactions. And the lower layers do not have the capabilities to distinguish such upper layer transactions and to optimize network performance utilizing such upper layer pull-oriented transactions. Thus, there is a need for improved handling of query-response transactions at the lower layers.

The mechanism and techniques described infra may expose query-response transactions to the lower layers and corresponding enablers, thus allowing improved or optimized handling of query-response transactions at the lower layers. Specifically, a lower layer may perform transaction-based delivery for query-response transactions initiated or defined at an upper layer. In certain configurations, the packets exchanged at the lower layer for a single query-response transaction may be all associated with a transaction ID that uniquely identifies the query-response transaction at least locally in the local network. Further, query-response transactions may be categorized as (1) Unitrieve, (2) Anytrieve, (3) Manytrieve, and (4) Multitrieve.

Unitrieve refers to an operation that fetches for a querying node a response from a single targeted responding node. Anytrieve refers to an operation that fetches for a querying node at least one response from any one responding node of a set of potential responding nodes. Manytrieve refers to an operation that fetches for a querying node M responses from any M different responding nodes of a set of potential responding nodes. M is an integer greater than 1. Multitrieve refers to an operation that fetches a response from each of multiple targeted responding nodes. The targeted responding nodes may be a subset of a set of potential responding nodes.

Depending on the specific configurations of the lower layers, packets of these types of transactions may be processed differently. The mechanisms and techniques described in the present disclosure can improve or optimize network performance, as the mechanisms and techniques distinguish, at the lower layers, packets of query-response transactions from traditional push-oriented packets (e.g., unicast packets).

FIG. 1 is a diagram 100 illustrating PHY/MAC/Link layer packets (frames) supporting query-response transactions. A lower layer request packet 110 may include a preamble 122, a destination address field 124, a source address field 126, a type field 128, a transaction ID field 130, a number-of-responses field 132, a query field 134, a pad field 136, and a checksum field 138. In particular, values set in the type field 128 may indicate that the lower layer request packet 110 is a query type and may indicate the transaction type of the query packet. For example, "000" may indicate a Unitrieve request. "001" may indicate a Multitrieve request. "010" may indicate an Anytrieve request. "011" may indicate a Manytrieve request. The most significant bit (e.g., "0") can be used to indicate the packet type such as that the lower layer request packet 110 is a query type. Further, NULL (or other preconfigured values) set in the type field 128 may also indicate the lower layer request packet 110 is to be processed as a legacy lower layer packet. A value set in the transaction ID field 130 can distinguish the lower layer request packet 110 from query packets of other query-response transactions. A value set in the number-of-responses field 132 indicates the number of response packets that the lower layer request packet 110 is seeking from responding nodes.

A lower layer response packet 150 may include a preamble 162, a destination address field 164, a source address field 166, a type field 168, a transaction ID field 170, a distinguisher ID field 172, a response field 174, a pad field 176, and a checksum field 178. In particular, values set in the type field 168 may indicate that the lower layer response packet 150 is a response type and may indicate the transaction type of the response packet. For example, "100" may indicate a Unitrieve request. "101" may indicate a Multitrieve request. "110" may indicate an Anytrieve request. "101" may indicate a Manytrieve request. The most significant bit (e.g., "1") can be used to indicate the packet type such as that the lower layer response packet 150 is a response type. Further, NULL (or other preconfigured values) set in the type field 168 may also indicate the lower layer response packet 150 is to be processed as a legacy lower layer packet. A value set in the transaction ID field 170 can distinguish the lower layer response packet 150 from response packets of other query-response transactions. A value set in the distinguisher ID field 172 can distinguish the lower layer response packet 150 from other unique response packets in the same query-response transaction.

Figure 2:
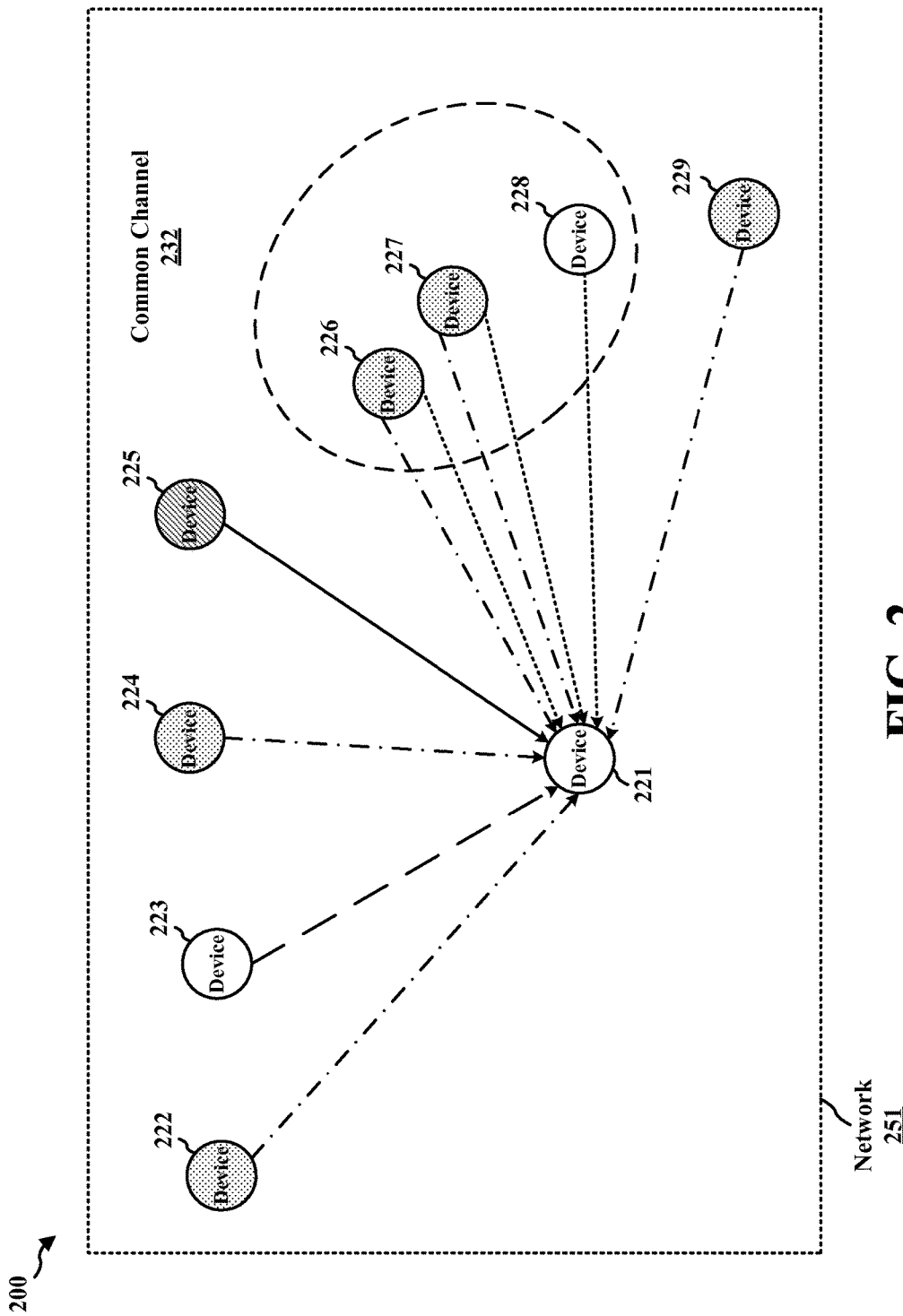
FIG. 2 is a diagram illustrating query-response transactions among devices in a network.

FIG. 2 is a diagram 200 illustrating query-response transactions among devices in a network. A network 251 includes, among other devices, devices 221-229 communicating on a common channel 232.

In one aspect, in certain circumstances, the device 221 may desire to retrieve a response from the device 225 (i.e., a targeted single responding node). The device 221 may use a Unitrieve packet for this query-response transaction. More specifically, the upper layer of the device 221 may construct an upper layer query packet. The upper layer query packet may include the upper layer network address of the device 225 and query information indicating the response information sought from the device 225. The PHY/MAC/Link layer of the device 221 may construct a lower layer request packet 110. The PHY/MAC/Link layer of the device 221 specifies the MAC address of the device 225 in the destination address field 124. The PHY/MAC/Link layer of the device 221 further specifies in the type field 128 that the lower layer request packet 110 is a Unitrieve request. A value may be set in the number-of-responses field 132 to indicate that one response is requested. Alternatively, the number-of-responses field 132 may be left empty, as a Unitrieve request implies that one response is requested. The PHY/MAC/Link layer of the device 221 further includes the upper layer query packet in the query field 134. The PHY/MAC/Link layer may generate or obtain, e.g., from a server, the transaction ID associated with this query-response transaction. The transaction ID may be a value that identifies the ongoing transaction and that is unique within the local neighborhood of the devices 221-229. The PHY/MAC/Link layer includes the transaction ID in the transaction ID field 130. The PHY/MAC/Link layer also accordingly prepares data for the preamble 122, the source address field 126, the pad field 136, and the checksum field 138. As such, the PHY/MAC/Link layer of the device 221 constructs the lower layer request packet 110. The device 221 transmits the constructed lower layer request packet 110 on the common channel 232. The device 225 subsequently receives the lower layer request packet 110.

Upon receiving the lower layer request packet 110 at the PHY/MAC/Link layer, the device 225 determines that the lower layer request packet 110 is a query packet based on the value set in the type field 128 and may obtain, among other things, the upper layer query packet and the transaction ID from the lower layer request packet 110, and accordingly construct an upper layer response packet having the response information requested by the upper layer query packet. The PHY/MAC/Link layer of the device 225 then constructs a lower layer response packet 150. For example, the PHY/MAC/Link layer includes the upper layer response packet in the response field 174, the MAC address of the device 221 in the destination address field 164, and the transaction ID in the transaction ID field 170. The PHY/MAC/Link layer specifies in the type field 168 that the lower layer response packet 150 is a Unitrieve response. The PHY/MAC/Link layer may not use the distinguisher ID field 172. The PHY/MAC/Link layer also accordingly prepares data for the preamble 162, the source address field 166, the pad field 176, and the checksum field 178. As such, the PHY/MAC/Link layer constructs the lower layer response packet 150. The device 225 then transmits the lower layer response packet 150 to the device 221 on the common channel 232.

In another aspect, in certain circumstances, the device 221 may desire to retrieve a response from any one of the devices 222-229. The device 221 may use an Anytrieve packet for this query-response transaction. In particular, the device 221 may construct a lower layer request packet 110. The PHY/MAC/Link layer of the device 221 may specify in the destination address field 124 a broadcast address that is directed to all the devices in the network 251, which include the devices 222-229. Further, the devices 222-229 may belong to the same multicast group. Accordingly, the PHY/MAC/Link layer may alternatively specify in the destination address field 124 a multicast address or a group index directed to the multicast group. Alternatively, the PHY/MAC/Link layer may specify in the destination address field 124 the address of each of the devices 222-229. The PHY/MAC/Link layer of the device 221 specifies in the type field 128 that the lower layer request packet 110 is an Anytrieve request. A value may be set in the number-of-responses field 132 to indicate that one response is requested. Alternatively, the number-of-responses field 132 may be left empty, as an Anytrieve request implies that one response is requested. Similarly to what was described supra in connection with Unitrieve, The PHY/MAC/Link layer of the device 221 further includes the upper layer query packet in the query field 134 as well as includes the transaction ID in the transaction ID field 130. The PHY/MAC/Link layer also accordingly prepares data for the preamble 122, the source address field 126, the pad field 136, and the checksum field 138. As such, the PHY/MAC/Link layer of the device 221 constructs the lower layer request packet 110. The device 221 transmits the constructed lower layer request packet 110 on the common channel 232. The devices 222-229 subsequently receive the lower layer request packet 110.

A particular device (e.g., the device 223) of the devices 222-229, upon receiving the lower layer request packet 110 at the PHY/MAC/Link layer, determines that the lower layer request packet 110 is a query packet based on the value set in the type field 128. In certain configurations, the particular device may temporarily buffer the lower layer request packet 110 at the PHY/MAC/Link layer for a predetermined or a random time period and may further determine whether a response packet having the same transaction ID is transmitted on the common channel 232 within that time period. If the particular device determines that such a response packet has been transmitted, the particular device may decide not to respond and, accordingly, may discard the received query packet. The particular device may choose to respond (e.g., upon determining that a response packet having the same transaction ID is not transmitted on the common channel 232 within the time period) and may obtain, among other things, the upper layer query packet and the transaction ID from the lower layer request packet 110, and accordingly construct an upper layer response packet having the response information requested by the upper layer query packet. Similarly to what was described supra in connection with Unitrieve, the PHY/MAC/Link layer of the particular device then constructs a lower layer response packet 150. The particular device then transmits the lower layer response packet 150 to the device 221 on the common channel 232.

In certain configurations, upon receiving the lower layer request packet 110 at the PHY/MAC/Link layer, the particular device may proceed to obtain an upper layer response packet at the upper layer and then construct a lower layer response packet 150 at the PHY/MAC/Link layer. While waiting for the upper layer response packet from the upper layer, while constructing the lower layer response packet 150, or while waiting for a transmission opportunity for transmitting the lower layer response packet 150, the PHY/MAC/Link layer may further determine whether a response packet having the same transaction ID has been transmitted on the common channel 232. Further, the PHY/MAC/Link layer may optionally buffer the constructed lower layer response packet 150 for a predetermined or a random time period. If the particular device determines that a response packet having the same transaction ID is transmitted while waiting/constructing or optionally in the buffering time period, the particular device may decide not to respond and, accordingly, may discard the constructed lower layer response packet 150. If the particular device determines that a response packet having the same transaction ID is not transmitted while waiting/constructing or optionally in the buffering time period, the particular device may transmit the constructed lower layer response packet 150 on the common channel 232.

In yet another aspect, in certain circumstances, the device 221 may desire to retrieve 5 responses (i.e., a configurable number of responses) from any 5 different devices of the devices 222-229. The device 221 may use a Manytrieve packet for this query-response transaction. In particular, the device 221 may construct a lower layer request packet 110. The PHY/MAC/Link layer of the device 221 may specify in the destination address field 124 one or more MAC addresses directed to all the devices 222-229 in the network 251, similarly to what was described supra in connection with Anytrieve. The PHY/MAC/Link layer of the device 221 specifies in the type field 128 that the lower layer request packet 110 is a Manytrieve request. A value (e.g., 5) may be set in the number-of-responses field 132 to indicate that 5 responses from 5 different responders are requested. The PHY/MAC/Link layer of the device 221 further includes the upper layer query packet in the query field 134. The PHY/MAC/Link layer may also specify a mechanism that may be used to generate a distinguisher ID, which is described infra. The PHY/MAC/Link layer of the device 221 includes the transaction ID in the transaction ID field 130. The PHY/MAC/Link layer also accordingly prepares data for the preamble 122, the source address field 126, the pad field 136, and the checksum field 138. As such, the PHY/MAC/Link layer of the device 221 constructs the lower layer request packet 110. The device 221 transmits the constructed lower layer request packet 110 on the common channel 232. The devices 222-229 subsequently receive the lower layer request packet 110.

Figure 3:
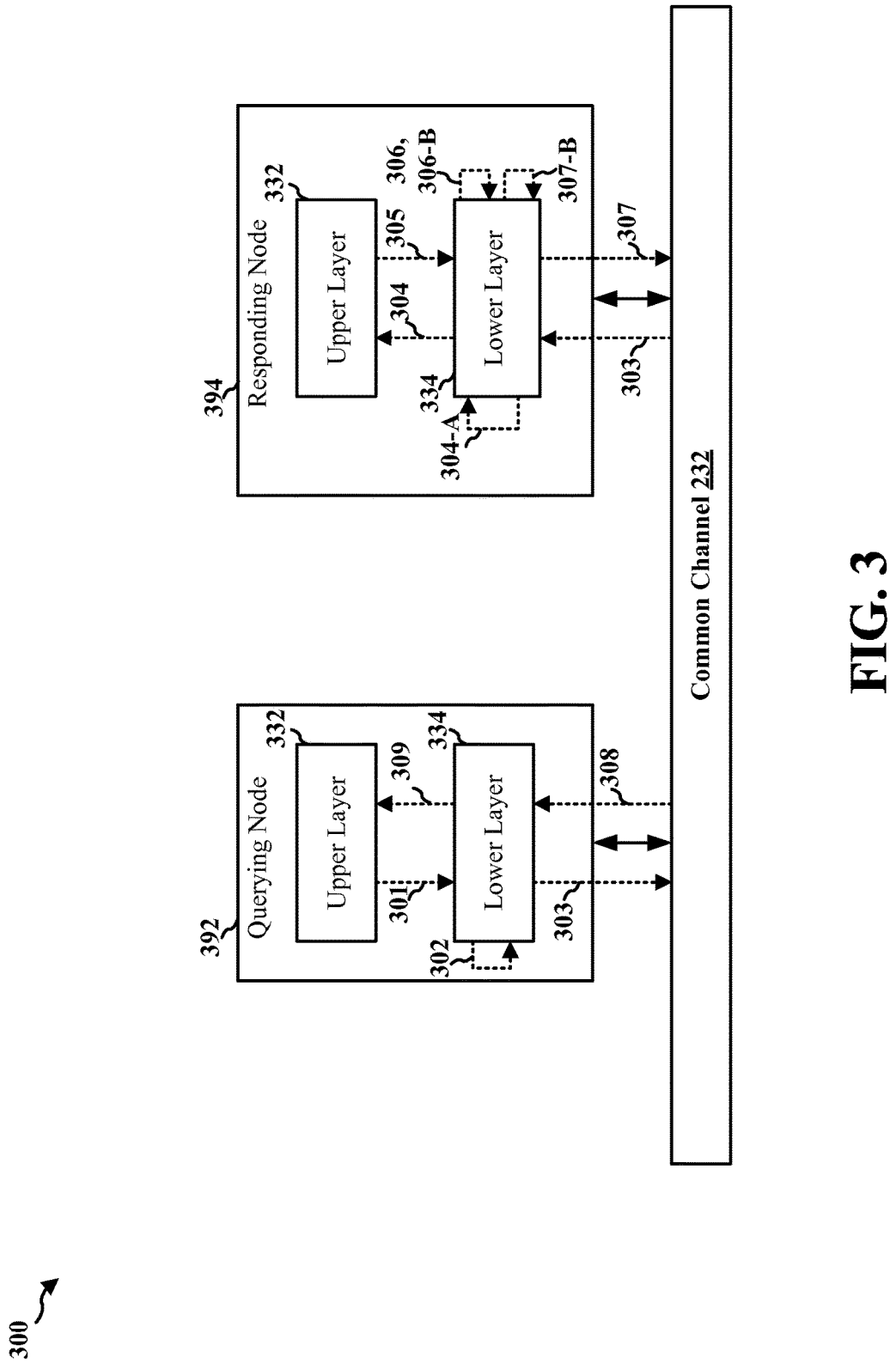
FIG. 3 is diagram illustrating operations of devices conducting query-response transactions.

Upon receiving the lower layer request packet 110 at the PHY/MAC/Link layer, a particular device of the devices 222-229 determines that the lower layer request packet 110 is a query packet based on the value set in the type field 128. In certain configurations, the PHY/MAC/Link layer may temporarily buffer the lower layer request packet 110 at the PHY/MAC/Link layer for a predetermined or a random time period. When the conditions regarding suppression techniques described infra in connection with operation 304-A illustrated in FIG. 3 are not met (e.g., the particular device determines that the requested number of distinguished responses have not been transmitted on the common channel 232), the particular device, may obtain, among other things, the upper layer query packet and the transaction ID from the lower layer request packet 110, and accordingly construct an upper layer response packet having the response information requested by the upper layer query packet. When the particular device determines that the conditions are met, the particular device may drop the buffered lower layer request packet 110 as described infra in connection with operation 304-A illustrated in FIG. 3.

The PHY/MAC/Link layer of the particular device then constructs a lower layer response packet 150. For example, the PHY/MAC/Link layer includes the upper layer response packet in the response field 174, the MAC address of the device 221 in the destination address field 164, and the transaction ID in the transaction ID field 170. The PHY/MAC/Link layer specifies in the type field 168 that the lower layer response packet 150 is a Manytrieve response. The PHY/MAC/Link layer may also obtain a distinguisher ID and include the distinguisher ID in the distinguisher ID field 172. The distinguisher ID is used to identify each unique lower layer response packet 150 within a transaction. For example, the particular device may re-transmit the same lower layer response packet 150, or a next hop node of the particular device may forward the same lower layer response packet 150. Thus, a neighbor device may receive multiple copies of the same lower layer response packet 150, which may have the same distinguisher ID. Upon determining that the distinguisher IDs are associated with the same response (e.g., the distinguisher IDs may be identical), the neighbor device may consider the multiple copies of the lower layer response packet 150 as one unique lower layer response packet 150 within the transaction and may drop the redundant response packets. Further, if the particular device is a next hop node for forwarding a lower layer response packet 150 with a particular distinguisher ID to a destination, and the particular device detects that another lower layer response packet 150 with the same particular distinguisher ID has already been transmitted toward the destination on the common channel 232, the particular device may drop the lower layer response packet 150 that is to be forwarded. The particular device may use a mechanism preconfigured at the PHY/MAC/Link layer to generate the distinguisher ID. The particular device may use the mechanism specified in the query field 134 of the received lower layer request packet 110 to generate the distinguisher ID. The PHY/MAC/Link layer also accordingly prepares data for the preamble 162, the source address field 166, the pad field 176, and the checksum field 178. As such, the PHY/MAC/Link layer constructs the lower layer response packet 150.

The particular device then transmits the lower layer response packet 150 to the device 221 on the common channel 232. In this example, the devices 222, 224, 226, 227, and 229 each transmit a response packet to the device 221.

In certain configurations, upon receiving the lower layer request packet 110 at the PHY/MAC/Link layer, the particular device may proceed to obtain an upper layer response packet at the upper layer and then construct a lower layer response packet 150 at the PHY/MAC/Link layer. While waiting for the upper layer response packet from the upper layer, while constructing the lower layer response packet 150, or while waiting for a transmission opportunity for transmitting the lower layer response packet 150, as well as optionally in an additional predetermined or random time period, the particular device may determine whether the conditions regarding suppression techniques described infra in connection with operations 306-B and 307-B illustrated in FIG. 3 are met. When the particular device determines that the conditions are not met (e.g., the particular device determines that the requested number of unique responses have not been transmitted on the common channel 232), the particular device then transmits the lower layer response packet 150 to the device 221 on the common channel 232. When the particular device determines that the conditions are met, the particular device may drop the upper layer response packet or the lower layer response packet 150 as described infra in connection with operations 306-B and 307-B illustrated in FIG. 3.

In another aspect, in certain circumstances, the device 221 may desire to retrieve a response packet from each of the devices 226-228. The device 221 may use a Multitrieve packet for this query-response transaction. In particular, the device 221 may construct a lower layer request packet 110. The devices 226-228 may belong to the same multicast group. Accordingly, the PHY/MAC/Link layer may specify in the destination address field 124 a multicast address or a group index directed to the multicast group. Alternatively, the PHY/MAC/Link layer may specify in the destination address field 124 the address of each of the devices 226-228. The PHY/MAC/Link layer of the device 221 specifies in the type field 128 that the lower layer request packet 110 is a Multitrieve request. A value may be set in the number-of-responses field 132 to indicate that 3 responses (e.g., corresponding to the targeted responding nodes) from the devices 226-228 are requested. The PHY/MAC/Link layer of the device 221 the construct the lower layer request packet 110 similarly to what was described supra in connection with Unitrieve. The device 221 transmits the constructed lower layer request packet 110 on the common channel 232. The devices 222-229 subsequently receive the lower layer request packet 110.

Upon receiving the lower layer request packet 110 at the PHY/MAC/Link layer, each of the devices 226-228 determines that the lower layer request packet 110 is a query packet based on the value set in the type field 128 and may obtain, among other things, the upper layer query packet and the transaction ID from the lower layer request packet 110, and accordingly construct an upper layer response packet having the response information requested by the upper layer query packet. The PHY/MAC/Link layer of each of the devices 222-229 then constructs a lower layer response packet 150. For example, the PHY/MAC/Link layer includes the upper layer response packet in the response field 174, the MAC address of the device 221 in the destination address field 164, and the transaction ID in the transaction ID field 170. The PHY/MAC/Link layer specifies in the type field 168 that the lower layer response packet 150 is a Multitrieve response. The PHY/MAC/Link layer may not use the distinguisher ID field 172. The PHY/MAC/Link layer also accordingly prepares data for the preamble 162, the source address field 166, the pad field 176, and the checksum field 178. As such, the PHY/MAC/Link layer constructs the lower layer response packet 150. Each of the devices 222-229 then transmits the respective lower layer response packet 150 to the device 221 on the common channel 232.

In one technique, the legacy PHY/MAC/Link layer API may be modified by adding parameters or by extending existing parameters to distinguish Anytrieve packets, Manytrieve packets, Unitrieve packets, Multitrieve packets, and legacy packets. For example, the Ethernet MAC layer API may be extended as: Enqueue(transaction_type, packet_type, packet, toAddress). As described supra, the transaction_type is one of the following: Anytrieve, Manytrieve, Unitrieve, Multitrieve, and NULL (or N/A). The NULL option means that the packet is not associated with a query-response transaction (i.e., a bi-directional transaction) and, thus, the processing may follow the legacy PHY/MAC/ Link layer flow for a push-oriented data packet. The packet type is either a query type or a response type for Anytrieve packets, Manytrieve packets, Unitrieve packets, and Multitrieve packets. The packet type is NULL (or N/A) for other packets. For Unitrieve packets, the toAddress (e.g., in the destination address field 124 of the lower layer request packet 110) may be a unicast address. For Anytrieve, Manytrieve, and Multitrieve query packets, the toAddress (e.g., in the destination address field 124 of the lower layer request packet 110) may be a multicast or broadcast address.

FIG. 3 is diagram 300 illustrating operations of devices conducting query-response transactions. A querying node 392 is communication with a responding node 394 on the common channel 232. Each of the querying node 392 and the responding node 394 has an upper layer 332 (e.g., the UDP/TCP/IP layer) and a lower layer 334 (e.g., the PHY/MAC/Link layer). To start a query-response transaction, the upper layer 332 of the querying node 392 (e.g., the device 221), at operation 301, constructs an upper layer query packet. The upper layer 332 then sends the upper layer query packet and an indication of the transaction type (i.e., a Unitrieve, a Multitrieve, an Anytrieve, or a Manytrieve) to the lower layer 334 using the extended lower layer API.

At operation 302, the lower layer 334 obtains or generates a transaction ID for the upper layer query packet. Alternatively, the transaction ID may have been obtained or generated by the upper layer 332 and passed down from the upper layer 332 to the lower layer 334 via the extended lower layer API in operation 301. The lower layer 334 constructs a lower layer request packet 110. Then, the lower layer 334 includes the transaction ID in the transaction ID field 130 and the upper layer query packet in the query field 134.

At operation 303, the lower layer 334 transmits the lower layer request packet 110 to the responding node 394 (i.e., the transaction responding device(s)) on the common channel 232. In the examples illustrated in FIG. 2, for the Unitrieve transaction described supra, the responding node 394 may be the device 225. For the Anytrieve transaction and the Manytrieve transaction described supra, the responding node 394 may be each of the devices 222-229. For the Multitrieve transaction described supra, the responding node 394 may be each of the devices 226-228.

At operation 304, the lower layer 334 of the responding node 394 receives the lower layer request packet 110. The lower layer 334 of the responding node 394 obtains the transaction ID and the transaction type. When the lower layer 334 determines that the transaction type is Anytrieve or Manytrieve, the lower layer 334 may, optionally, in a first technique of suppression, perform operation 304-A described infra. The lower layer 334 then, when operation 304-A is not performed or when operation 304-A is performed to determine that further processing is needed, passes the upper layer query packet to the upper layer 332 of the responding node 394 along with the transaction information.

At operation 304-A, when executed, the lower layer 334 of the responding node 394 stores (e.g., in a buffer) the received lower layer request packet 110 with the associated transaction information, and starts a wait timer. The lower layer 334 determines the value M indicated in the number-of-responses field 132. For Anytrieve, M is 1. For Manytrieve, M is an integer greater than 1. The lower layer 334 listens to the transmission resources before passing the upper layer query packet to the upper layer 332. If M lower layer response packets 150 with the same transaction ID and different distinguisher IDs are received before the wait time expires, the lower layer 334 suppresses the transaction processing and refrains from sending a response packet. For example, the lower layer 334 may discard the lower layer request packet 110. Within operation 304-A, if the wait timer expires before the lower layer 334 detects M lower layer response packets 150 with the same transaction ID and different distinguisher IDs, the lower layer 334 determines to pass the buffered upper layer query packet to the upper layer 332 along with the transaction information for further processing.

At operation 305, the upper layer processes the upper layer query packet, when received, and obtains the requested information accordingly. The upper layer then constructs the upper layer response packet, and sends the upper layer response packet with the transaction ID and an indication of the packet type (i.e., a response type) to the lower layer 334 of the responding node 394.

At operation 306, the lower layer 334 of the responding node 394 processes the upper layer response packet and handles the packet according to the transaction type, the transaction ID, and the packet type. For example, at this point, a lower layer response packet 150 may be scheduled, delayed, or suppressed in accordance with the transaction type and the specific lower layer, as described infra. When the transaction type is Anytrieve or Manytrieve, the lower layer 334 may, optionally, in a second technique of suppression, perform operation 306-B described infra.

At operation 306-B, the lower layer 334 stores the lower layer response packet 150 (e.g., in a buffer) and listens to the transmission resources while awaiting a transmission opportunity. Further, the response transmission may intentionally be delayed by a predetermined or random time period.

At operation 307, the responding node 394, when needed, transmits the lower layer response packet 150 to the querying node 392 on the common channel 232. When the transaction type is Anytrieve or Manytrieve, prior to transmitting the lower layer response packet 150, the lower layer 334 may, optionally, in the second technique of suppression, perform operation 307-B.

At operation 307-B, when executed, the lower layer 334 obtains the value M set in the number-of-responses field 132 of the corresponding lower layer request packet 110. For Anytrieve, M is 1. For Manytrieve, M is an integer greater than 1. If M lower layer response packets 150 with the same transaction ID and different distinguisher IDs are received before the lower layer response packet 150 is sent, the lower layer 334 suppresses transmitting the lower layer response packet 150. For example, the lower layer 334 may discard the lower layer request packet 110.

Further, the devices 221-229 implementing query-response transaction based packet processing may control the medium access at the lower layer with richer information and, thus, enhance network efficiency. For example, the lower layer may allocate response resources in advance to minimize contention for Anytrieve and Manytrieve operations.

The querying node 392, based on the number of responses desired for a query packet (M responses in this example), may request, either by a centralized controller or in a distributed manner, allocation of future resource on the common channel 232 for the transmission of the responses, which is referred to as response resource. The size of the allocated response resource, in the unit of transmission slot, may depend on the expected number of distinguished responses. For M responses, the number of time slots allocated is a function of M, i.e., f(M). Alternatively, the size of the allocated response resource may be set to a default value.

In this example, within operation 301, the upper layer 332 may indicate the number of desired responses (i.e., M) to the lower layer 334. Within operation 302, the lower layer 334 may include the number of desired responses in the number-of-responses field 132 of the lower layer request packet 110 being constructed. Within operation 303, the lower layer 334 transmits the lower layer request packet 110 including the number of desired responses on the common channel 232.

Upon receiving a lower layer request packet 110 indicating M desired responses, the devices 221-229 may use a collision avoidance mechanism to spread responder transmissions to the reserved f(M) slots to minimize collisions.

In a first technique, the devices 221-229 may implement a spreading mechanism. Using the spreading mechanism, each of the responding nodes may determine a device-specific parameter N. Then, the responding node may use a spreading function (f') to select the f' (M, N)-th slot among the f(M) slot for responding a response packet. For example, N may be the hash value of the node ID (or MAC address) of the responding node.

In a second technique, the devices 221-229 may implement a backoff mechanism. The responding nodes may contend in the allocated resources. Each responding node selects a transmission time slot and starts a backoff timer to keep track of time and to determine the selected time slot. The responding node then starts transmitting a response packet in the selected time slot. The transmission time slot can be selected from the response resource in various manners. For example, the devices 221-229 may be configured to select the transmission time slot randomly. Alternatively, the devices 221-229 may be configured to select the transmission time slot based on a function of the received signal strength of the query packet. Alternatively, each of the devices 221-229 may be configured to select the transmission time slot based on a function of device ID hash of the each device. Alternatively, each of the devices 221-229 may be configured to select the transmission time slot based on a function of statistics for the corresponding information identifier.

Further, the devices 221-229 may employ a hybrid use of the above two techniques.

Furthermore, the querying node may determine a query failure occurred when all f(M) slots have been used and less then the desired number (i.e., M) of response packets have been successfully received. The querying node may reinitiate the query-response transaction by sending the query packet again. In certain configurations, the resource usage may be further optimized by limiting the retrieval query re-initiation to the circumstances where the query failure is due to collisions. The querying node may listen to all response resources and judges the failure is due to collision when the common channel 232 is busy in at least a portion of allocated slots where no response is successfully received. If collisions are detected, the querying node may re-initiate the query-response transaction up to N re-initiations. N is a configurable integer. The querying node may request a smaller number of response packets and provide a list of excluded responding nodes in the re-initiated query packet to further reduce resource usage. Upon receiving the query packet, the excluded responding nodes each do not transmit a response packet, thus reducing traffic on the common channel 232 during the response resource.

Figure 4:
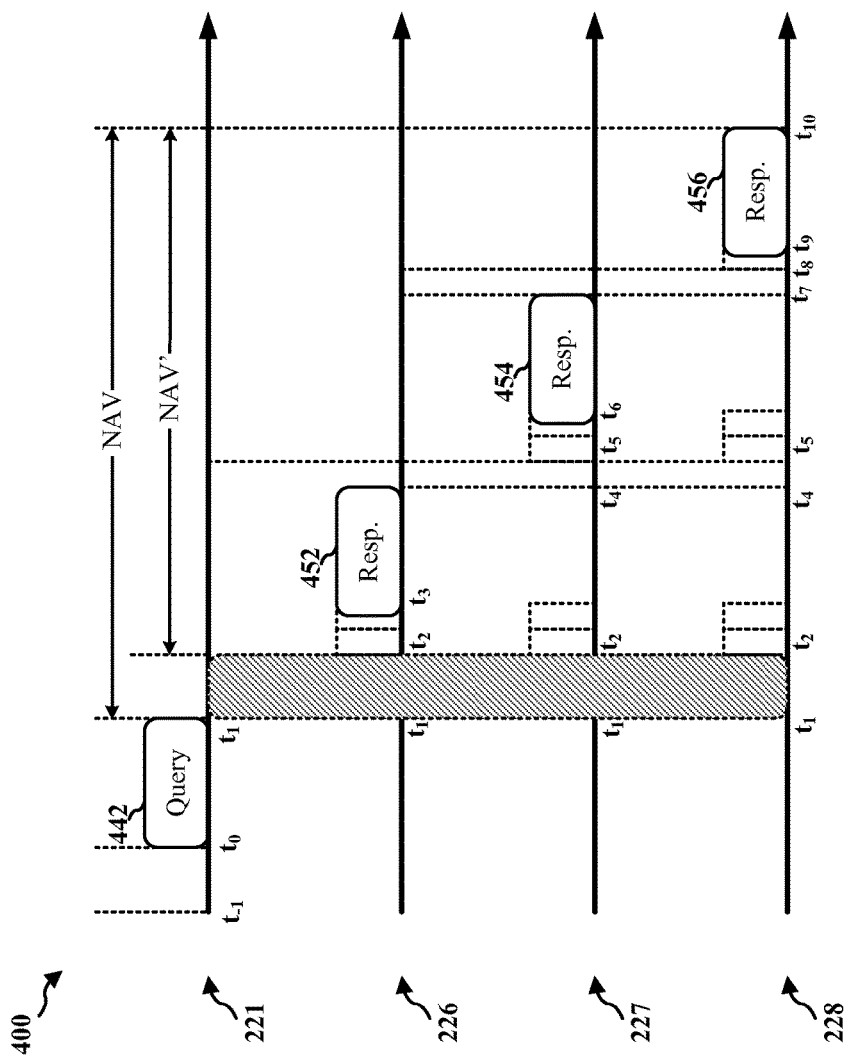
FIG. 4 is diagram illustrating resource allocation for query-response transactions in a WiFi (e.g., IEEE 802.11) environment.

FIG. 4 is diagram 400 illustrating resource allocation for query-response transactions in a WiFi (e.g., IEEE 802.11) environment. In this example, the device 221 desires to initiate a Multirieve request, i.e., a query packet 442, that are directed to the devices 226-228 and that requires 3 responses, i.e., response packets 452, 454, 456. The device 221 constructs the query packet 442 (i.e., a lower layer request packet 110) and includes, among other things, a corresponding upper layer query packet in the query field 134, an indication of "3" in the number-of-responses field 132, and a MAC address associated with the devices 226-228 in the destination address field 124. Further, the device 221 using a resource allocation mechanism (e.g., f(M)) to determine the response resource. In this example, the resource allocation mechanism may be a contention mechanism and the response resource may include, among other things, a process time period for processing the query packet, the transmission time for transmitting 3 response packets, one short interframe space (SIFS) between two consecutive response packet transmissions, and a contention window. Because the number of potential responding nodes is 3, the resource allocation mechanism employed by the devices 221-229 determines that the contention window includes 5 time slots in this example. The device 221 accordingly includes in the query packet 442 a NAV indicating the determined response resource. In this example, the NAV indicates the time period from time point $t_1$ to time point $t_{10}$ as described infra. As such, the non-targeted devices on the common channel 232 may observe the NAV and refrain from transmitting signals during the time period (i.e., the determined response resource) indicated by the NAV.

At time point $t_{-1}$, the device 221 detects that the common channel 232 is free. After waiting for a distributed coordination function (DCF) interframe space (DIFS) and a backoff time period, at time point $t_0$, the device 221 transmits the query packet 442 on the common channel 232. The devices 226-228 complete the reception of the query packet 442 at time point $t_1$. Each of the devices 226-228 then uses the time period from time point $t_1$ to time point $t_2$ to process the query packet 442.

At time point $t_2$, the devices 226-228 complete processing the query packet 442 and determine the value included in the number-of-responses field 132 (i.e., "3" in this example). In this example, the devices 221-229 are configured to use a backoff mechanism. Using the backoff mechanism, the device 226 determines that it is allocated the second time slot of the contention window, which includes 5 time slots in this example. The device 227 determines that it is allocated the fourth time slot of the contention window. The device 228 determines that it is allocated the fifth time slot of the contention window. At time point $t_2$, each of the devices 226-228 may start a timer to determine the time slots in the contention window.

Subsequently, the device 226, based on the timer, may determine when the first time slot has passed. When the device 226 also determines that no transmission occurred in the first time slot, the device 226 then transmits the response packet 452 at time point $t_3$ within the second time slot. The device 227 and the device 228 detect the transmission of the response packet 452 in the second time slot and then stop the timer used to determine the time slots in the contention window.

At time point $t_4$, the device 227 and the device 228 detect that the transmission of the response packet 452 is completed. The device 227 and the device 228 wait a SIFS and, at time point $t_5$, start the timers again.

The device 227, based on the timer, may determine when the third time slot has passed. When the device 227 also determines that no transmission occurred in the third time slot, the device 227 then transmits the response packet 454 at time point $t_6$ within the fourth time slot. The device 228 detects the transmission of the response packet 454 in the fourth time slot and then stops the timer used to determine the time slots in the contention window.

At time point $t_7$, the device 228 detects that the transmission of the response packet 454 is completed. The device 228 waits a SIFS and, at time point $t_8$, starts the timer again.

The device 228 determines that it is the start of the fifth time slot at the time point $t_8$. The device 228 then transmits the response packet 456 at time point $t_9$ within the fifth time slot. The device 228 completes the transmission of the response packet 456 at time point $t_{10}$, which is at the end of NAV.

In another configuration, the device 221 may set the NAV (NAV' shown in FIG. 4) to reserve the resource from time point $t_2$ to time point $t_{10}$ (instead of from time point $t_1$ to time point $t_{10}$). In other words, the device 221 does not reserve the resource from time point $t_1$ to time point $t_2$, which is used for processing the query packet 442 but not for data transmission, for this query-response transaction. Accordingly, other devices on the common channel 232 not participating this query-response transaction may still use the common channel 232 during the time period from time point $t_1$ to time point $t_2$ for data transmission.

Figure 5:
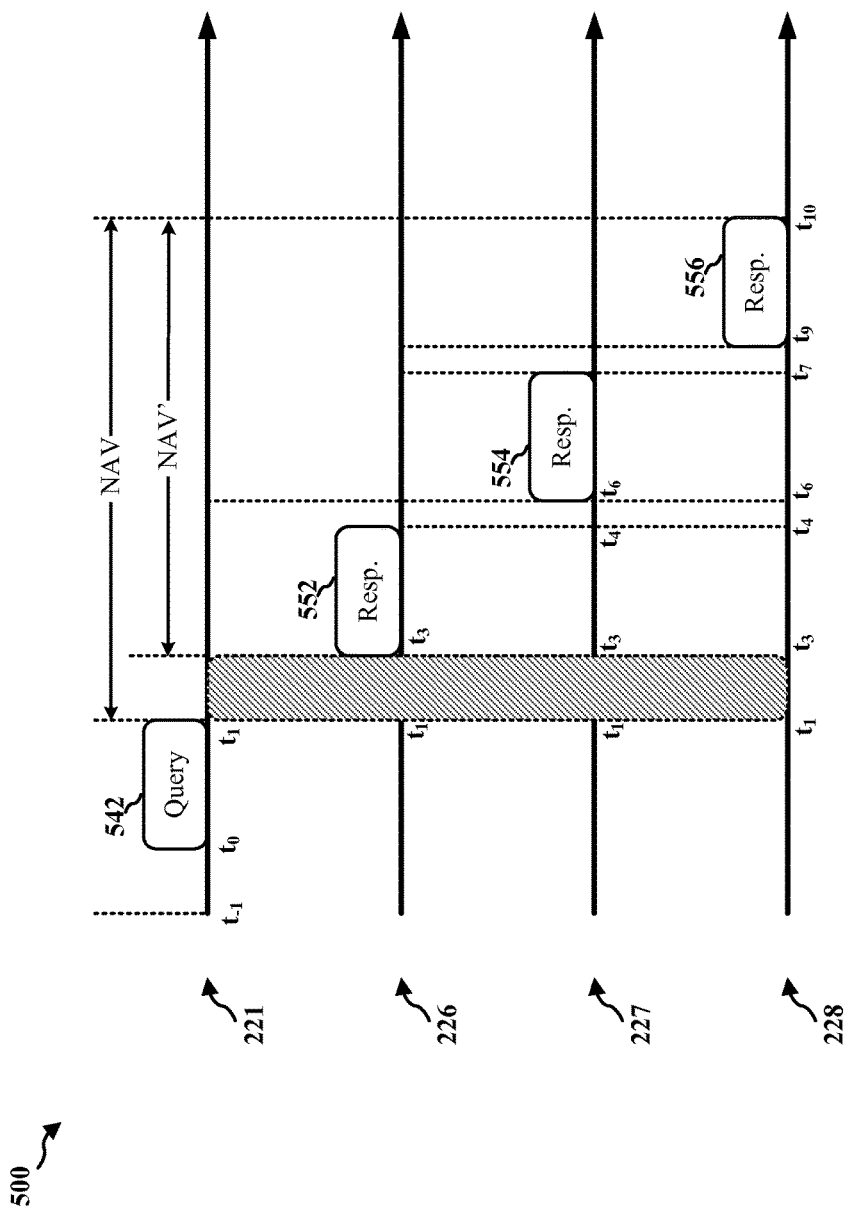
FIG. 5 is another diagram illustrating resource allocation for query-response transactions in a WiFi (e.g., IEEE 802.11) environment.

FIG. 5 is another diagram 500 illustrating resource allocation for query-response transactions in a WiFi (e.g., IEEE 802.11) environment. In this example, the device 221 desires to initiate a Multitrieve request, i.e., a query packet 542, that are directed to the devices 226-228 and that requires 3 responses, i.e., response packets 552, 554, 556. The device 221 constructs the query packet 542 (i.e., a lower layer request packet 110) and includes, among other things, a corresponding upper layer query packet in the query field 134, an indication of "3" in the number-of-responses field 132, and a MAC address associated with the devices 226-228 in the destination address field 124. Further, the device 221 using a resource allocation mechanism (e.g., f(M)) to determine the response resource. In this example, the response resource may be a channel assignment mechanism and may include, among other things, a process time period for processing the query packet, the transmission time for transmitting 3 response packets, and one SIFS between two consecutive response packet transmissions. The device 221 accordingly includes in the query packet 542 a NAV indicating the determined response resource. As such, the non-targeted devices on the common channel 232 may observe the NAV and refrain from transmitting signals during the time period (i.e., the determined response resource) indicated by the NAV.

At time point $t_{-1}$, the device 221 detects that the common channel 232 is free. After waiting for a DIFS and a backoff time period, at time point $t_0$, the device 221 transmits the query packet 542 on the common channel 232. The devices 226-228 complete the reception of the query packet 542 at time point $t_1$. Each of the devices 226-228 then uses the time period from time point $t_1$ to time point $t_3$ to process the query packet 542.

At time point $t_3$, the devices 226-228 complete processing the query packet 542 and determine the value included in the number-of-responses field 132 (i.e., "3" in this example). In this example, the devices 221-229 are configured to use a random selection mechanism (e.g., coin-toss mechanism). In another example, the devices 221-229 may be configured to use a spreading mechanism that spreads allocation of multiple time slots. Using the random selection mechanism, the device 226 determines that it is the first responding node to transmit a response packet. The device 227 determines that it is the second responding node to transmit a response packet. The device 228 determines that it is the third responding node to transmit a response packet.

The device 226, at time point $t_3$, determines that it is the opportunity or time slot for the first responding node to transmit a response packet 552. The device 226 then transmits the response packet 552 at time point $t_3$. The device 227 and the device 228 detect the transmission of the response packet 552.

At time point $t_4$, the device 227 and the device 228 detect that the transmission of the response packet 552 is completed. The device 227 waits a SIFS and, at time point $t_6$, determines that it is the opportunity or time slot for the second responding node to transmit a response packet 554. The device 227 then transmits the response packet 554 at time point $t_6$. The device 228 detects the transmission of the response packet 554.

At time point $t_7$, the device 228 detects that the transmission of the response packet 554 is completed. The device 228 waits a SIFS and, at time point $t_9$, determines that it is the opportunity or time slot for the third responding node to transmit a response packet 554. The device 227 then transmits the response packet 554 at time point $t_9$. The device 228 completes the transmission of the response packet 556 at time point $t_{10}$, which is at the end of NAV.

In another configuration, the device 221 may set the NAV (NAV' shown in FIG. 5) to reserve the resource from time point $t_3$ to time point $t_{10}$ (instead of from time point $t_1$ to time point $t_{10}$). In other words, the device 221 does not reserve the resource from time point $t_1$ to time point $t_2$, which is used for processing the query packet 542 but not for data transmission, for this query-response transaction. Accordingly, other devices on the common channel 232 not participating this query-response transaction may still use the common channel 232 during the time period from time point $t_1$ to time point $t_2$ for data transmission.

In certain configurations, the devices may use both the contention mechanism and the channel assignment mechanism. For example, a querying device may want to retrieve 3 different responses from any 3 of 5 responding devices. The querying node may first obtain a NAV, then may divide NAV by 3 and require that NAV/3 is slightly longer than the response transmission time for each desired response. Then, the requesting device may announce an assignment mechanism such that the first and second responding devices contend for slot 1, the third and fourth responding devices contend for slot 2, and the fifth responding device is assigned slot 3. This technique may be useful in circumstances where the number of devices is large and desired responses are few such that the assignment-induced delays are less critical than contention collisions.

Figure 6:
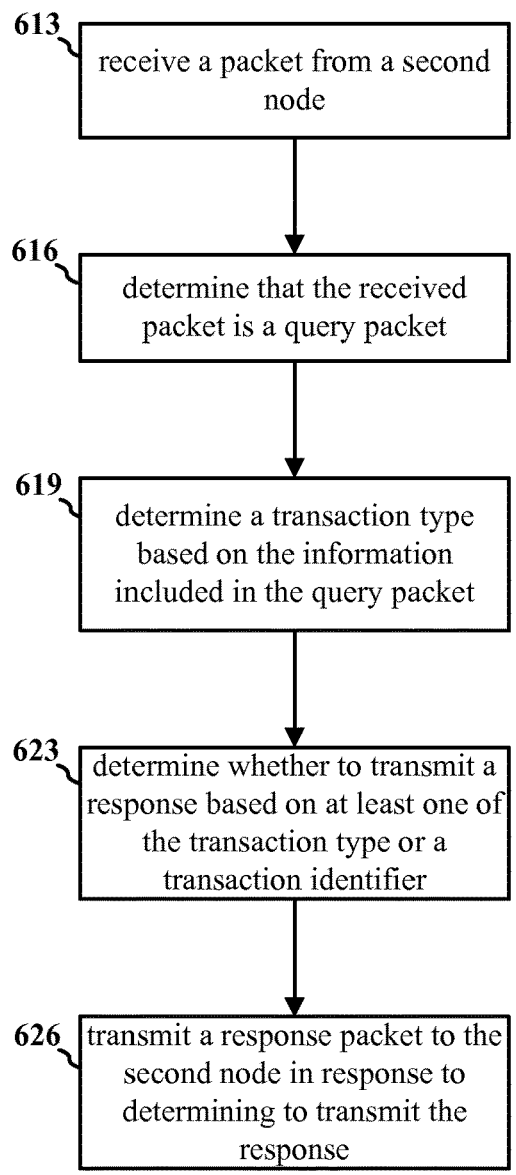
FIG. 6 is a flow chart of a method (process) of communication at a responding node in a query-response transaction.

FIG. 6 is a flow chart 600 of a method (process) of communication at a responding node in a query-response transaction. The method may be performed by a first node (e.g., the devices 221-229, the apparatus 1302/1302').

At operation 613, the first node receives a receiving a packet from a second node. In certain configurations, the packet includes packet type information indicating whether the packet is a query or a response. At operation 616, the first node determines that the received packet is a query packet, the query packet including information indicating at least a transaction identifier. In certain configurations, the received packet is determined to be a query packet based on the packet type information in the received packet. For example, referring to FIG. 2, upon receiving the lower layer request packet 110 at the PHY/MAC/Link layer, the device 225 determines that the lower layer request packet 110 is a query packet based on the value set in the type field 128.

At operation 619, the first node determines a transaction type based on the information included in the query packet. In certain configurations, the transaction type indicates one of: (a) the query packet requests a response from one node, (b) the query packet requests a response from any nodes of a set of nodes, (c) the query packet requests a response from any M nodes of N nodes, where N is greater than M, or (d) the query packet requests a response from each node of a set of nodes.

At operation 623, the first node determines whether to transmit a response packet based on at least one of the transaction type or a transaction identifier. In certain configurations, the first node determines whether to suppress a transmission of a response packet in response to the query packet based on at least the transaction type. In certain configurations, the determination whether to transmit the response packet is performed at at least one of a PHY layer, a MAC layer, or a link layer. At operation 626, the first node transmits a response packet to the second node in response to determining to transmit the response. For example, referring to FIG. 2, each of the devices 222-229 determines a transaction type based on the information included in the query packet, and determines whether to suppress a transmission of a response packet or to transmit the response packet.

Figure 7:
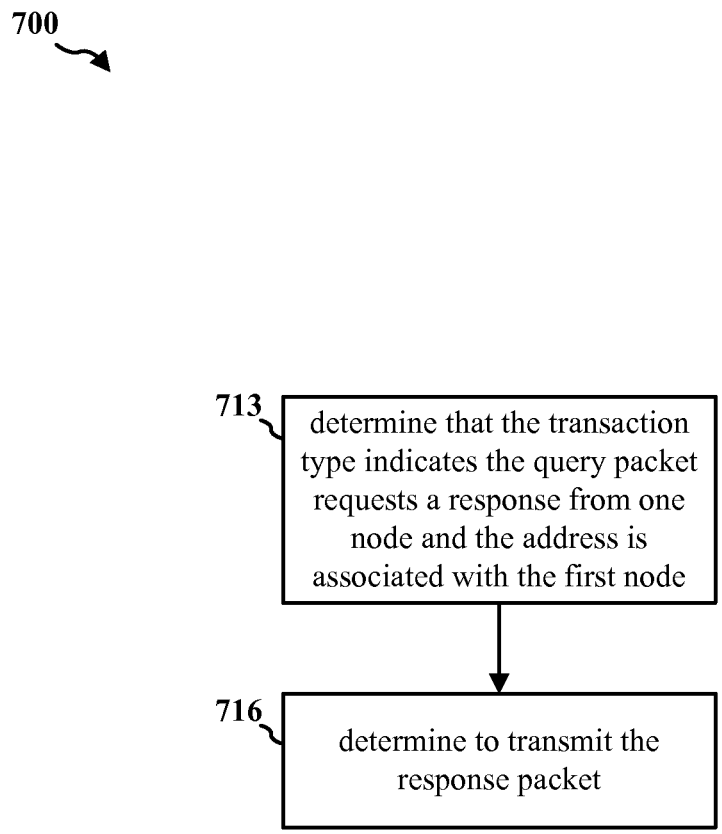
FIG. 7 is a flow chart of a method (process) implementing a Unitrieve transaction.

FIG. 7 is a flow chart 700 of a method (process) implementing a Unitrieve transaction. The method may be performed by a first node (e.g., the devices 221-229, the apparatus 1302/1302').

In certain configurations, the query packet further includes an address. Within operation 623 illustrated in FIG. 6, the first node, at operation 713, determines that the transaction type indicates the query packet requests a response from one node and the address is associated with the first node. At operation 716, the first node determines to transmit the response packet. For example, referring to FIG. 2, the device 221 and the device 225 conduct a Unitrieve transaction.

Figure 8:
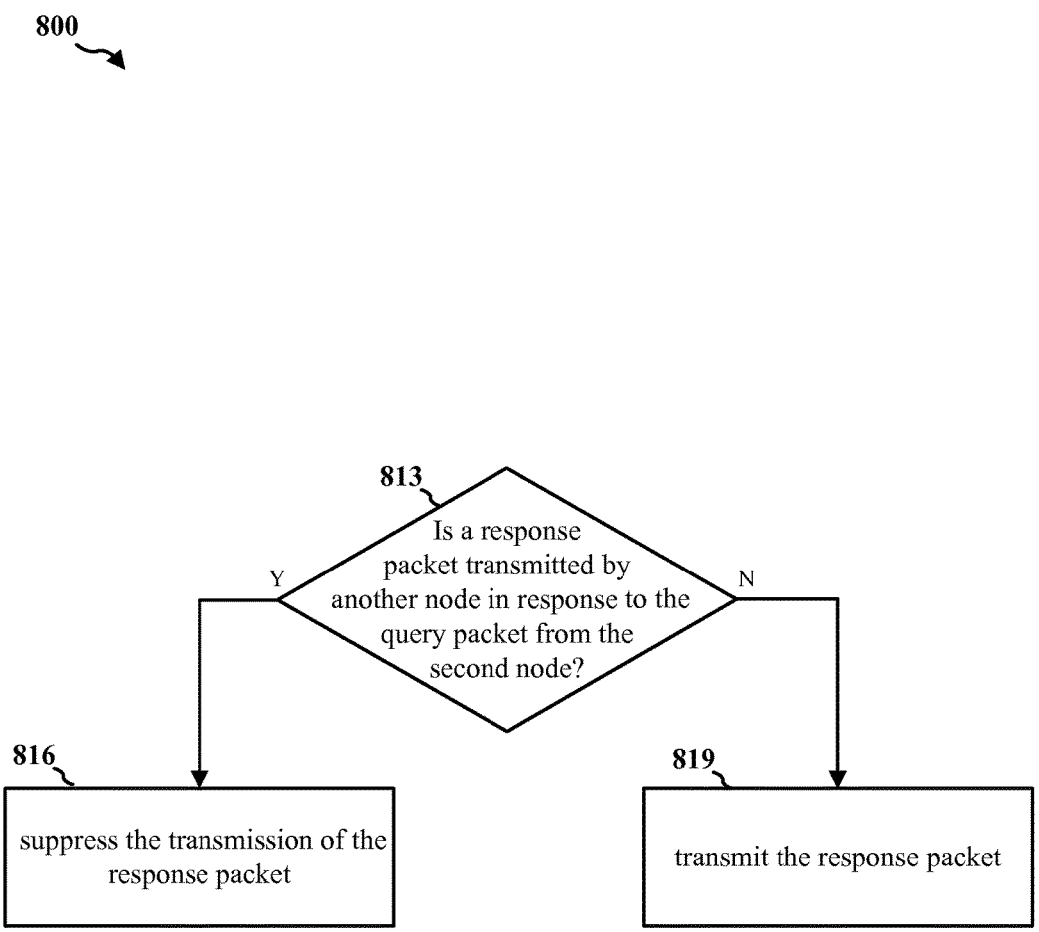
FIG. 8 is a flow chart of a method (process) of implementing an Anytrieve transaction.

FIG. 8 is a flow chart 800 of a method (process) of implementing an Anytrieve transaction. The method may be performed by a first node (e.g., the devices 221-229, the apparatus 1302/1302').

In certain configurations, the query packet further includes a transaction identifier and the transaction type indicates that the query packet requests a response from any nodes of a set of nodes. Within operation 623 illustrated in FIG. 6, the first node, at operation 813, determines whether a response packet is transmitted by another node in response to the query packet from the second node based on whether a transaction identifier in the response packet matches with the transaction identifier in the query packet.

At operation 816, the first node determines to suppress the transmission of the response packet in response to determining that a response packet is transmitted by said another node in response to the query packet. At operation 819, the first node determines to transmit the response packet in response to determining that a response packet is not transmitted by said another node in response to the query packet. In certain configurations, when determining to suppress the transmission of the response packet, at least one of a PHY layer, a MAC layer, or a link layer determines to suppress the transmission of the response packet before communicating the received query packet to an upper layer.

In certain configurations, when determining to suppress the transmission of the response packet, at least one of a PHY layer, a MAC layer, or a link layer determines to suppress the transmission of the response packet after communicating the received query packet to an upper layer and after receiving the response packet for transmission from the upper layer. For example, referring to FIG. 2, the device 221 and the devices 222-229 (particularly the device 223) conduct an Anytrieve transaction.

Figure 9:
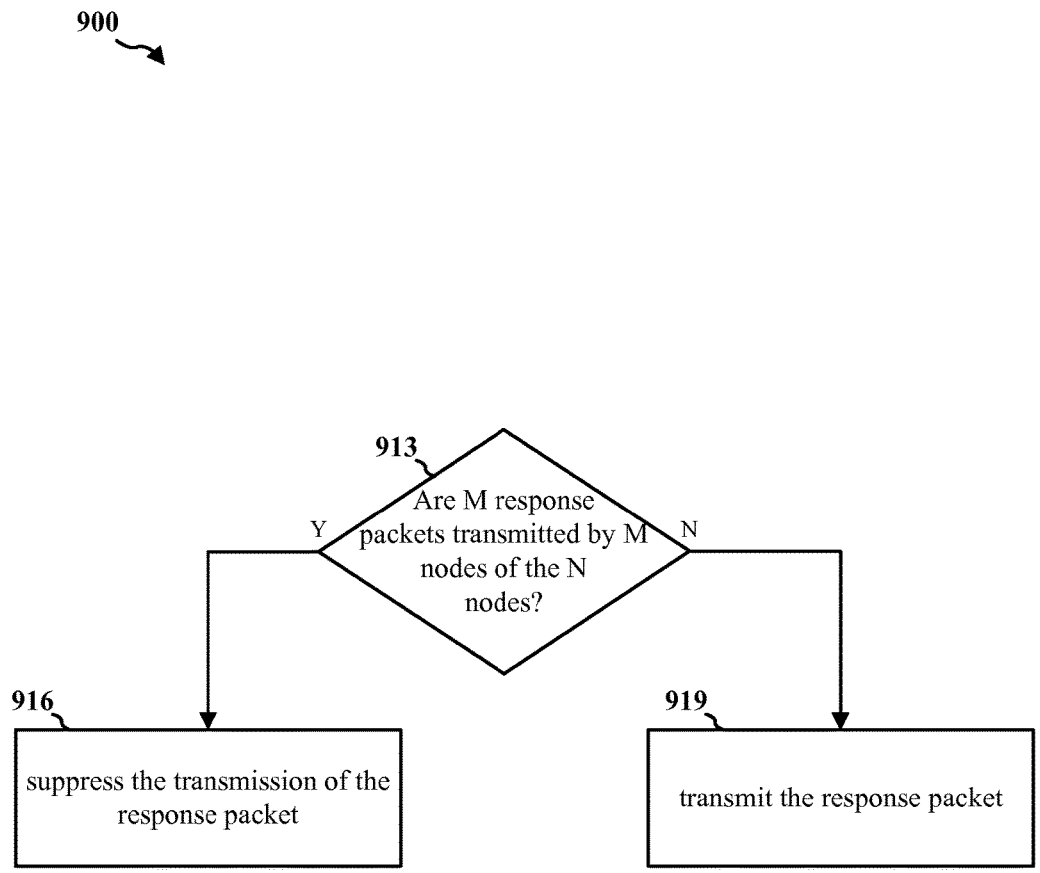
FIG. 9 is a flow chart of a method (process) of implementing a Manytrieve transaction.

FIG. 9 is a flow chart 900 of a method (process) of implementing a Manytrieve transaction. The method may be performed by a first node (e.g., the devices 221-229, the apparatus 1302/1302').

In certain configurations, the query packet further includes a transaction identifier and the transaction type indicates that the query packet requests a response from any M nodes of N nodes. Within operation 623 illustrated in FIG. 6, the first node, at operation 913, determines whether M response packets are transmitted by M nodes of the N nodes in response to the query packet from the second node based on whether a transaction identifier in each of the response packets matches with the transaction identifier in the query packet. The M response packets are distinguished from each other. For example, referring to FIG. 2, the lower layer response packets 150 may each include a distinguisher ID to distinguish from each other. A particular device may receive multiple copies of the same lower layer response packet 150, which may have the same distinguisher ID. Upon determining that the distinguisher IDs are associated with the same response (e.g., the distinguisher IDs may be identical), the particular device may consider the multiple copies of the lower layer response packet 150 as one unique lower layer response packet 150 within the transaction and may drop the redundant response packets. Particularly, if the particular device is a next hop node for forwarding to a destination a lower layer response packet 150 with a particular distinguisher ID, and the particular device detects that another lower layer response packet 150 with the same particular distinguisher ID has already been transmitted toward the destination on the common channel 232, the particular device may drop the lower layer response packet 150 that is to be forwarded. In certain configurations, the decision about packet transmission (e.g., transmit/schedule) or packet drop may be made by the particular device or a network management device in accordance with policy enforcement or congestion conditions, etc.

When M response packets are transmitted by the M nodes in response to the query packet, at operation 916, the first node may determine to suppress the transmission of the response packet. Further, if the first node determines a first response packet (with a particular distinguisher ID), which is to be transmitted, has the same particular distinguisher ID as a second response packet that has already been transmitted by another node, the first node may determine to suppress the transmission of the first response packet. When response packets are transmitted by less than M nodes of the N nodes in response to the query packet, at operation 919, the first node may determine to transmit the response packet.

In certain configurations, when determining to suppress the transmission of the response packet, at least one of a PHY layer, a MAC layer, or a link layer determines to suppress the transmission of the response packet before communicating the received query packet to an upper layer. In certain configurations, when determining to suppress the transmission of the response packet, at least one of a PHY layer, a MAC layer, or a link layer determines to suppress the transmission of the response packet after communicating the received query packet to an upper layer and after receiving the response packet for transmission from the upper layer. For example, referring to FIG. 2, the device 221 and the devices 222-229 (particularly the devices 222, 224, 226, 227, and 229) conduct a Manytrieve transaction.

Figure 10:
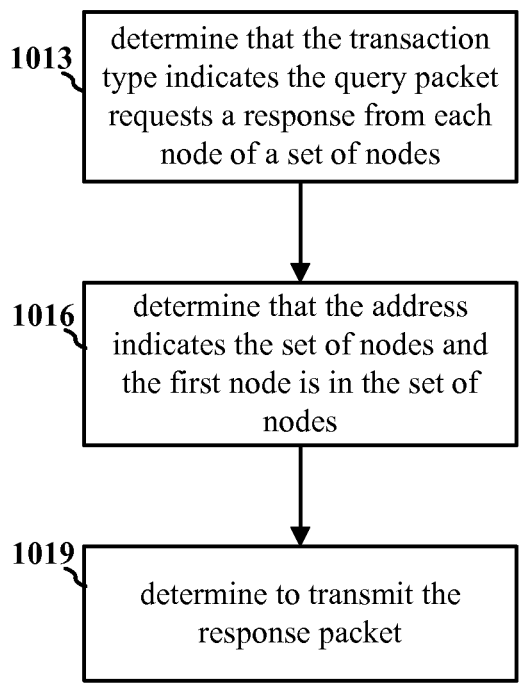
FIG. 10 is a flow chart of a method (process) of implementing a Multitrieve transaction.

FIG. 10 is a flow chart 1000 of a method (process) of implementing a Multitrieve transaction. The method may be performed by a first node (e.g., the devices 221-229, the apparatus 1302/1302'). In certain configurations, the query packet further includes an address. Within operation 623 illustrated in FIG. 6, the first node, at operation 1013, determines that the transaction type indicates the query packet requests a response from each node of a set of nodes. At operation 1016, the first node determines that the address indicates the set of nodes, and the first node is in the set of nodes. At operation 1019, the first node determines to transmit the response packet. For example, referring to FIG. 2, the device 221 and the devices 226-228 conduct a Multitrieve transaction.

Figure 11:
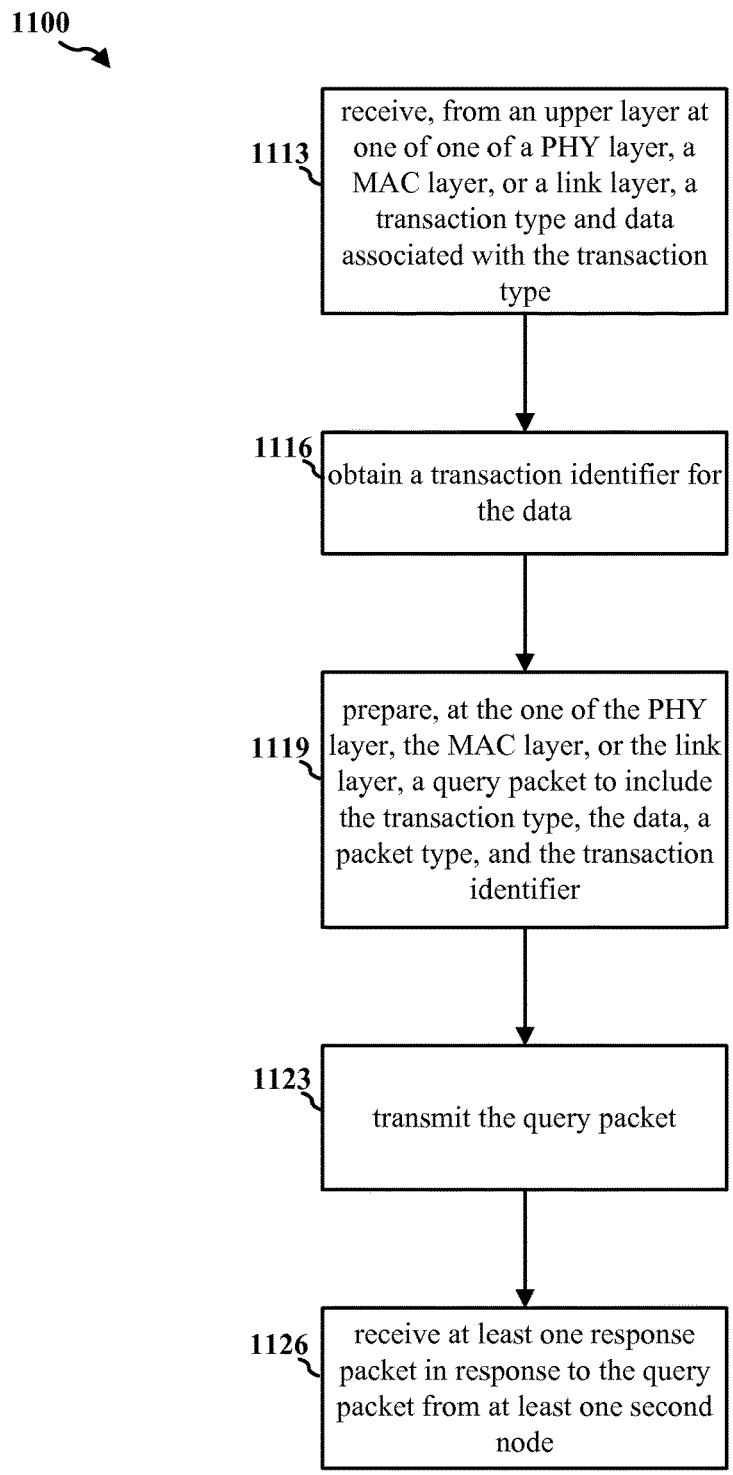
FIG. 11 is a flow chart of a method (process) of communication at a querying node in a query-response transaction.

FIG. 11 is a flow chart 1100 of a method (process) of communication at a querying node in a query-response transaction. The method may be performed by a first node (e.g., the devices 221-229, the apparatus 1302/1302'). At operation 1113, the first node receives, from an upper layer and at at least one of a PHY layer, a MAC layer, or a link layer, a transaction type and data associated with the transaction type. At operation 1116, the first node obtains a transaction identifier for the data.

At operation 1119, the first node prepares, at the one of the PHY layer, the MAC layer, or the link layer, a query packet to include the transaction type, the data, a packet type, and the transaction identifier, wherein the packet type indicates that the query packet is a query, wherein the transaction type indicates one of (a) the query packet requests a response from one node, (b) the query packet requests a response from any nodes of a set of nodes, (c) the query packet requests a response from any M nodes of N nodes where N is greater than M, or (d) the query packet requests a response from each node of a set of nodes; and At operation 1123, the first node transmits the query packet. In certain configurations, the query packet from the upper layer includes the transaction type and the packet type. The transaction identifier is obtained at the PHY layer, the MAC layer, or the link layer. In certain configurations, at operation 1126, the first node receives at least one response packet in response to the query packet from at least one second node. Each of the at least one response packet includes the transaction identifier. For example, referring to FIG. 2, the device 221 is a querying node.

Figure 12:
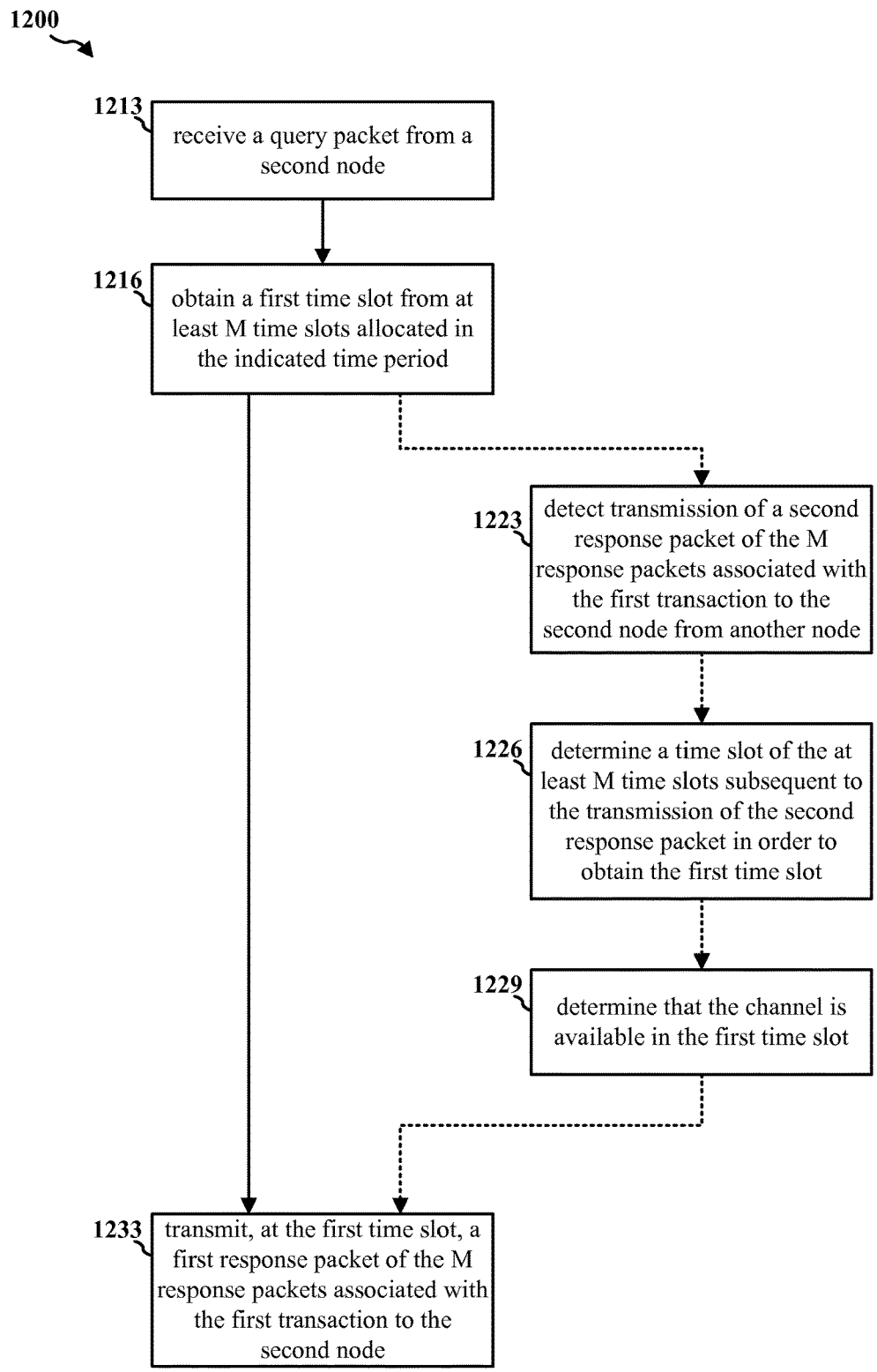
FIG. 12 is a flow chart of a method (process) of communication for resource allocation in a query-response transaction.

FIG. 12 is a flow chart 1200 of a method (process) of communication for resource allocation in a query-response transaction. The method may be performed by a first node (e.g., the devices 221-229, the apparatus 1302/1302'). At operation 1213, the first node receives a query packet from a second node, wherein the query packet may include: (a) an indication of a first transaction with which the query packet is associated, (b) an indication that M response packets associated with the first transaction is requested by the second node, M being an integer greater than 0, (c) an indication of a time period allocated for transmitting the M response packets to the second node on a channel, and (d) an indication of at least one of a channel assignment mechanism or a contention mechanism to be used to allocate at least M time slots. In certain configurations, each of the M response packets includes a respective distinguisher ID that distinguishes from the distinguisher IDs of the rest of the M response packets.

At operation 1216, the first node obtains a first time slot from the at least M time slots allocated in the indicated time period for accessing a channel in accordance with the indicated at least one of contention mechanism or channel assignment mechanism. In certain configurations, the channel assignment mechanism is a spreading mechanism that spreads allocation of the at least M time slots. The first time slot is obtained in accordance with the spreading mechanism. In certain configurations, the first time slot is obtained in accordance with a contention mechanism through which the first node contends for a time slot of the at least M time slots with other nodes.

Further, at operation 1223, the first node detects transmission of a second response packet of the M response packets associated with the first transaction to the second node from another node. At operation 1226, the first node determines a time slot of the at least M time slots subsequent to the transmission of the second response packet in order to obtain the first time slot. At operation 1229, the first node determines that the channel is available in the first time slot. In certain configurations, the first time slot is obtained at a PHY layer, a MAC layer, or a link layer. At operation 1233, the first node transmits, at the first time slot, a first response packet of the M response packets associated with the first transaction to the second node on the channel. For example, referring to FIGS. 4-5, the device 221 and the devices 226-228 utilize the method to allocate resources.

Figure 13:
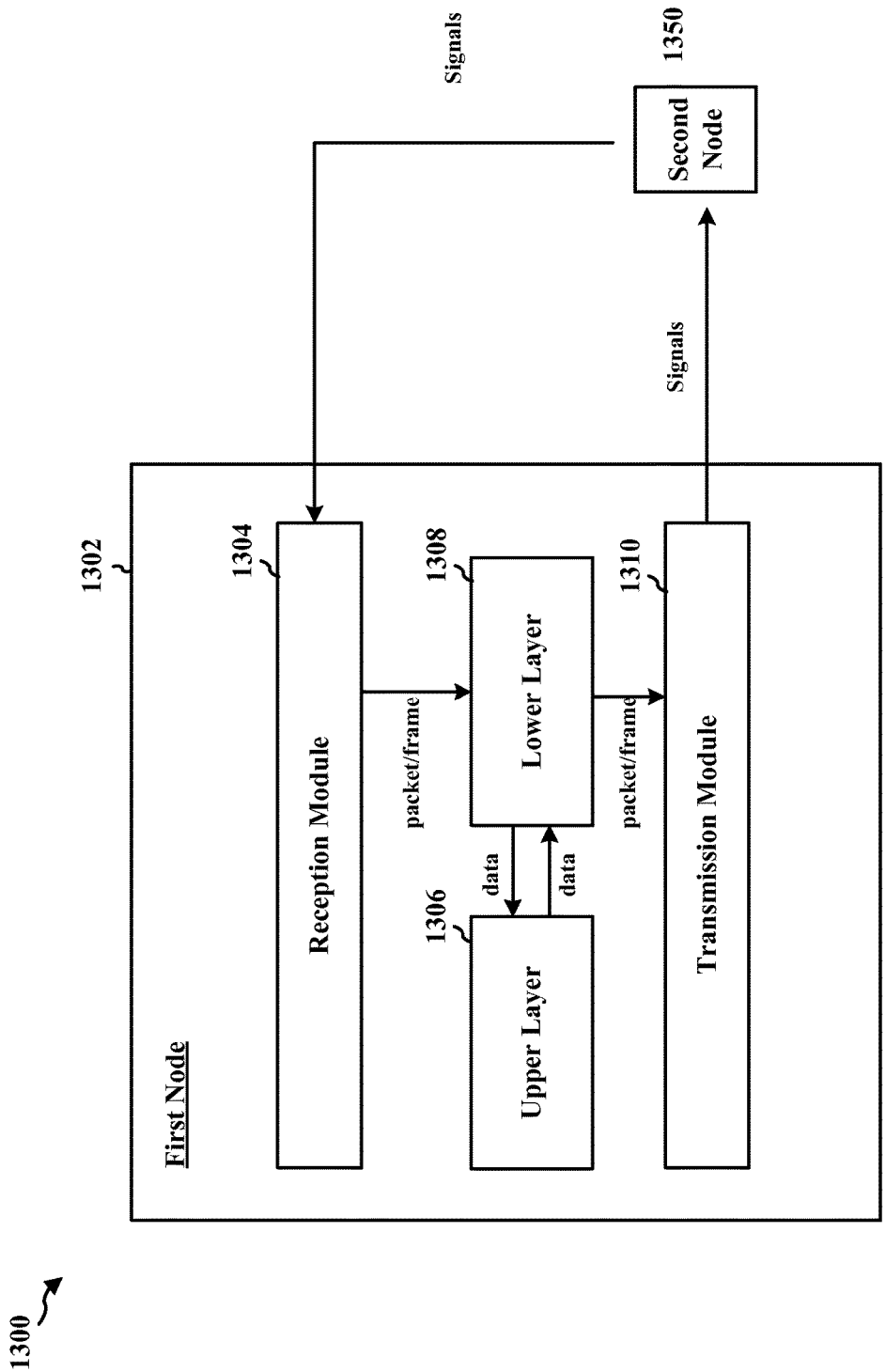
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus may be a first node. The apparatus includes a reception module 1304, an upper layer 1306, a lower layer 1308, and a transmission module 1310. The apparatus 1302/1302' may be configured to receive signals from a second node 1350.

In one aspect, the reception module 1304 may be configured to receive a packet from a second node 1350. The lower layer 1308 may be configured to determine that the received packet is a query packet, the query packet including information indicating at least a transaction identifier. The lower layer 1308 may be configured to determine a transaction type based on the information included in the query packet. The lower layer 1308 may be configured to determine whether to transmit a response packet based on at least one of the transaction type or a transaction identifier. The lower layer 1308 and/or the transmission module 1310 may be configured to transmit a response packet to the second node 1350 in response to determining to transmit the response.

In certain configurations, the lower layer 1308 may be configured to determine whether to suppress a transmission of a response packet in response to the query packet based on at least the transaction type.

In certain configurations, the determination whether to transmit the response packet is performed at at least one of a PHY layer, a MAC layer, or a link layer of the lower layer 1308.

In certain configurations, the packet includes packet type information indicating whether the packet is a query or a response, and the received packet is determined to be a query packet based on the packet type information in the received packet.

In certain configurations, the transaction type indicates one of: (a) the query packet requests a response from one node, (b) the query packet requests a response from any nodes of a set of nodes, (c) the query packet requests a response from any M nodes of N nodes, where N is greater than M, or (d) the query packet requests a response from each node of a set of nodes.

In certain configurations, the query packet further includes an address, and the lower layer 1308 may be configured to determine to transmit the response packet when the transaction type indicates the query packet requests a response from one node and the address is associated with the first node.

In certain configurations, the query packet further includes a transaction identifier and the transaction type indicates that the query packet requests a response from any nodes of a set of nodes. The lower layer 1308 may be configured to determine whether a response packet is transmitted by another node in response to the query packet from the second node 1350 based on whether a transaction identifier in the response packet matches with the transaction identifier in the query packet. The lower layer 1308 may be configured to determine to suppress the transmission of the response packet in response to determining that a response packet is transmitted by said another node in response to the query packet. The lower layer 1308 may be configured to determine to transmit the response packet in response to determining that a response packet is not transmitted by said another node in response to the query packet.

In certain configurations, when determining to suppress the transmission of the response packet, at least one of a PHY layer, a MAC layer, or a link layer of the lower layer 1308 may be configured to determine to suppress the transmission of the response packet before communicating the received query packet to the upper layer 1306.

In certain configurations, when determining to suppress the transmission of the response packet, at least one of a PHY layer, a MAC layer, or a link layer of the lower layer 1308 may be configured to determine to suppress the transmission of the response packet after communicating the received query packet to the upper layer 1306 and after receiving the response packet for transmission from the upper layer 1306.

In certain configurations, the query packet further includes a transaction identifier and the transaction type indicates that the query packet requests a response from any M nodes of N nodes. The lower layer 1308 may be configured to determine whether M response packets are transmitted by M nodes of the N nodes in response to the query packet from the second node 1350 based on whether a transaction identifier in each of the response packets matches with the transaction identifier in the query packet. The M response packets are distinguished from each other. The lower layer 1308 may be configured to determine to suppress the transmission of the response packet in response to determining that M response packets are transmitted by said M nodes in response to the query packet. The lower layer 1308 may be configured to determine to transmit the response packet in response to determining that response packets are transmitted by less than M nodes of the N nodes in response to the query packet.

In certain configurations, when determining to suppress the transmission of the response packet, at least one of a PHY layer, a MAC layer, or a link layer of the lower layer 1308 may be configured to determine to suppress the transmission of the response packet before communicating the received query packet to the upper layer 1306.

In certain configurations, when determining to suppress the transmission of the response packet, at least one of a PHY layer, a MAC layer, or a link layer of the lower layer 1308 may be configured to determine to suppress the transmission of the response packet after communicating the received query packet to the upper layer 1306 and after receiving the response packet for transmission from the upper layer 1306.

In certain configurations, the query packet further includes an address. The lower layer 1308 may be configured to determine to transmit the response packet when the transaction type indicates the query packet requests a response from each node of a set of nodes, where the address indicates the set of nodes, and the first node is in the set of nodes.

In another aspect, at least one of a PHY layer, a MAC layer, or a link layer of the lower layer 1308 may be configured to receive, from the upper layer 1306, a transaction type and data associated with the transaction type.

The lower layer 1308 may be configured to obtain a transaction identifier for the data.

The one of the PHY layer, the MAC layer, or the link layer of the lower layer 1308 may be configured to prepare a query packet to include the transaction type, the data, a packet type, and the transaction identifier. The packet type indicates that the query packet is a query. The transaction type indicates one of (a) the query packet requests a response from one node, (b) the query packet requests a response from any nodes of a set of nodes, (c) the query packet requests a response from any M nodes of N nodes where N is greater than M, or (d) the query packet requests a response from each node of a set of nodes. The lower layer 1308 and/or the transmission module 1310 may be configured to transmit the query packet.

In certain configurations, the query packet from the upper layer includes the transaction type and the packet type. The transaction identifier is obtained at the PHY layer or the MAC layer or a link layer.

In certain configurations, the reception module 1304 and/or the lower layer 1308 may be configured to receive at least one response packet in response to the query packet from at least one second node 1350. Each of the at least one response packet includes the transaction identifier.

In another aspect, the reception module 1304 and/or the lower layer 1308 may be configured to receive a query packet from a second node 1350. The query packet may include: (a) an indication of a first transaction with which the query packet is associated, (b) an indication that M response packets associated with the first transaction is requested by the second node 1350, M being an integer greater than 0, (c) an indication of a time period allocated for transmitting the M response packets to the second node 1350 on a channel, and (d) an indication of at least one of a channel assignment mechanism or a contention mechanism to be used to allocate at least M time slots.

The lower layer 1308 may be configured to obtain a first time slot from the at least M time slots allocated in the indicated time period for accessing a channel in accordance with the indicated at least one of contention mechanism or channel assignment mechanism.

The lower layer 1308 and/or the transmission module 1310 may be configured to transmit, at the first time slot, a first response packet of the M response packets associated with the first transaction to the second node 1350 on the channel.

In certain configurations, each of the M response packets includes a respective distinguisher ID that distinguishes from the distinguisher IDs of the rest of the M response packets.

In certain configurations, the channel assignment mechanism is a spreading mechanism that spreads allocation of the at least M time slots. The first time slot is obtained in accordance with the spreading mechanism.

In certain configurations, the first time slot is obtained in accordance with a contention mechanism through which the first node contends for a time slot of the at least M time slots with other nodes. The reception module 1304 and/or the lower layer 1308 may be configured to detect transmission of a second response packet of the M response packets associated with the first transaction to the second node 1350 from another node. The lower layer 1308 may be configured to determine a time slot of the at least M time slots subsequent to the transmission of the second response packet in order to obtain the first time slot.

In certain configurations, the first time slot is obtained at a PHY layer, a MAC layer, or a Link layer of the lower layer 1308.

In certain configurations, the lower layer 1308 may be configured to determine that the channel is available in the first time slot.

Figure 14:
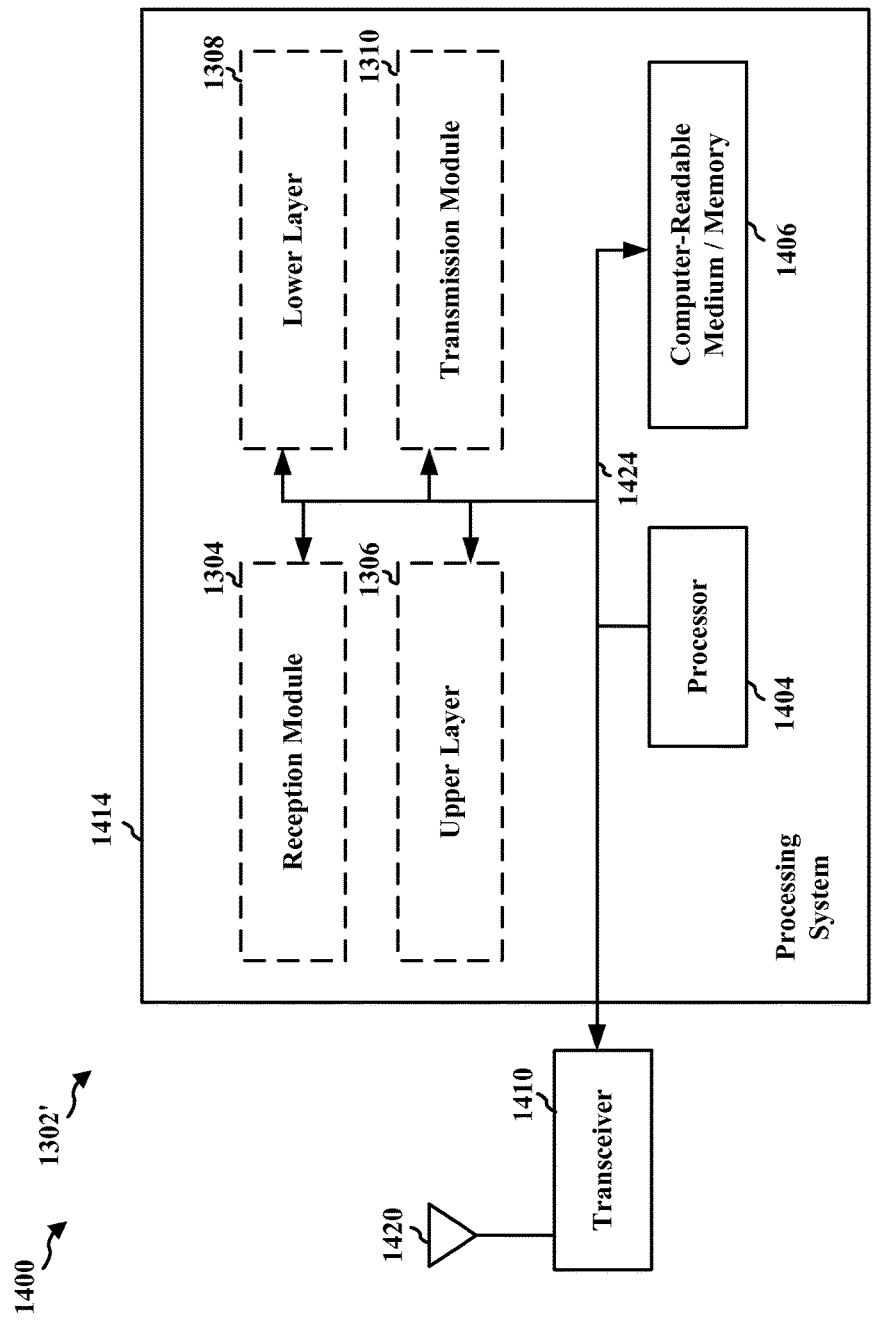
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1304, 1306, 1308, 1310, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides means for communicating with various other apparatus over a transmission medium. The transceiver 1410 receives a signal from the one or more antennas 1420, extracts information from the received signal, and provides the extracted information to the processing system 1414, specifically the reception module 1304. In addition, the transceiver 1410 receives information from the processing system 1414, specifically the transmission module 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system further includes at least one of the modules 1304, 1306, 1308, and 1310. The modules may be software modules running in the processor 1404, resident/stored in the computer readable medium/memory 1406, one or more hardware modules coupled to the processor 1404, or some combination thereof.

The processing system 1414 may be a component of the devices 221-229. In one configuration, the apparatus 1302/1302' for communication includes means for performing operations illustrated in FIGS. 6-12.

Specifically, in one aspect, the apparatus 1302/1302' includes means for receiving a packet from a second node.

The apparatus 1302/1302' includes means for determining that the received packet is a query packet, the query packet including information indicating at least a transaction identifier. The apparatus 1302/1302' includes means for determining a transaction type based on the information included in the query packet. The apparatus 1302/1302' includes means for determining whether to transmit a response packet based on at least one of the transaction type or a transaction identifier.

The apparatus 1302/1302' includes means for transmitting a response packet to the second node in response to determining to transmit the response. The apparatus 1302/1302' may be configured to include means for determining whether to suppress a transmission of a response packet in response to the query packet based on at least the transaction type. The determination whether to transmit the response packet is performed at at least one of a PHY layer, a MAC layer, or a link layer. The means for determining that the first packet is a query packet may be configured to perform the determination at a lower layer. The lower layer is a PHY layer, a MAC layer, or a LINK layer.

The packet may include packet type information indicating whether the packet is a query or a response, and the received packet may be determined to be a query packet based on the packet type information in the received packet. The transaction type may indicate one of: (a) the query packet requests a response from one node, (b) the query packet requests a response from any nodes of a set of nodes, (c) the query packet requests a response from any M nodes of N nodes, where N is greater than M, or (d) the query packet requests a response from each node of a set of nodes.

The query packet further includes an address. The means for determining whether to transmit may be configured to determine to transmit the response packet when the transaction type indicates the query packet requests a response from one node and the address is associated with the apparatus 1302/1302'.

The query packet may further include a transaction identifier and the transaction type indicates that the query packet requests a response from any nodes of a set of nodes. The apparatus 1302/1302' may be configured to include means for determining whether a response packet is transmitted by another node in response to the query packet from the second node based on whether a transaction identifier in the response packet matches with the transaction identifier in the query packet. The means for determining whether to suppress may be configured to determine to suppress the transmission of the response packet in response to determining that a response packet is transmitted by said another node in response to the query packet. The means for determining whether to transmit may be configured to determine to transmit the response packet in response to determining that a response packet is not transmitted by said another node in response to the query packet.

When determining to suppress the transmission of the response packet, at least one of a PHY layer, a MAC layer, or a link layer may determine to suppress the transmission of the response packet before communicating the received query packet to an upper layer. When determining to suppress the transmission of the response packet, at least one of a PHY layer, a MAC layer, or a link layer may determine to suppress the transmission of the response packet after communicating the received query packet to an upper layer and after receiving the response packet for transmission from the upper layer.

The query packet further includes a transaction identifier and the transaction type indicates that the query packet requests a response from any M nodes of N nodes. The apparatus 1302/1302' may be configured to include means for determining whether M response packets are transmitted by M nodes of the N nodes in response to the query packet from the second node based on whether a transaction identifier in each of the response packets matches with the transaction identifier in the query packet. The M response packets are distinguished from each other. The means for determining whether to suppress may be configured to determine to suppress the transmission of the response packet in response to determining that M response packets are transmitted by said M nodes in response to the query packet. The means for determining whether to transmit may be configured to determine to transmit the response packet in response to determining that response packets are transmitted by less than M nodes of the N nodes in response to the query packet.

When determining to suppress the transmission of the response packet, at least one of PHY layer, or a MAC layer, or a link layer determines to suppress the transmission of the response packet before communicating the received query packet to an upper layer. When determining to suppress the transmission of the response packet, at least one of a PHY layer, a MAC layer, or a link layer determines to suppress the transmission of the response packet after communicating the received query packet to an upper layer and after receiving the response packet for transmission from the upper layer.

The query packet may further include an address. The means for determining whether to transmit may be configured to determine to transmit the response packet when the transaction type indicates the query packet requests a response from each node of a set of nodes. The address indicates the set of nodes. The apparatus 1302/1302' is in the set of nodes.

In another aspect, the apparatus 1302/1302' includes means for receiving, from an upper layer and at at least one of a PHY layer, a MAC layer, or a link layer, a transaction type and data associated with the transaction type. The apparatus 1302/1302' includes means for obtaining a transaction identifier for the data. The apparatus 1302/1302' includes means for preparing, at the one of the PHY layer, the MAC layer, or the link layer, a query packet to include the transaction type, the data, a packet type, and the transaction identifier. The packet type indicates that the query packet is a query. The transaction type indicates one of (a) the query packet requests a response from one node, (b) the query packet requests a response from any nodes of a set of nodes, (c) the query packet requests a response from any M nodes of N nodes where N is greater than M, or (d) the query packet requests a response from each node of a set of nodes.

The apparatus 1302/1302' includes means for transmitting the query packet. The query packet from the upper layer includes the transaction type and the packet type. The transaction identifier is obtained at the PHY layer or the MAC layer or a link layer. The apparatus 1302/1302' may be configured to include means for receiving at least one response packet in response to the query packet from at least one second node. Each of the at least one response packet including the transaction identifier.

In another aspect, the apparatus 1302/1302' includes means for receiving a query packet from a second node. The query packet includes: (a) an indication of a first transaction with which the query packet is associated, (b) an indication that M response packets associated with the first transaction is requested by the second node, M being an integer greater than 0, (c) an indication of a time period allocated for transmitting the M response packets to the second node on a channel, and (d) an indication of at least one of a channel assignment mechanism or a contention mechanism to be used to allocate at least M time slots.

The apparatus 1302/1302' includes means for obtaining a first time slot from the at least M time slots allocated in the indicated time period for accessing a channel in accordance with the indicated at least one of contention mechanism or channel assignment mechanism. The apparatus 1302/1302' includes means for transmitting, at the first time slot, a first response packet of the M response packets associated with the first transaction to the second node on the channel. Each of the M response packets may include a respective distinguisher ID that distinguishes from the distinguisher IDs of the rest of the M response packets.

The first time slot may be obtained in accordance with a spreading mechanism that spreads allocation the at least M time slots. The first time slot may be obtained in accordance with a contention mechanism through which the first node contends for a time slot of the at least M time slots with other nodes. The apparatus 1302/1302' may be configured to include means for detecting transmission of a second response packet of the M response packets associated with the first transaction to the second node from another node. The apparatus 1302/1302' may be configured to include means for determining a time slot of the at least M time slots subsequent to the transmission of the second response packet in order to obtain the first time slot. The first time slot may be obtained at a PHY layer, a MAC layer, or a link layer. The apparatus 1302/1302' includes means for determining that the channel is available in the first time slot.

The aforementioned means may be one or more of the aforementioned modules of the apparatus 1302 and/or the processing system 1414 of the apparatus 1302' configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of communication at a first node, comprising:
receiving a packet from a second node including type information indicating whether the received packet is a query packet or a response, and including a transaction identifier uniquely identifying an ongoing query-response transaction within a local neighborhood of the first and the second nodes;
determining that the received packet is a query packet based on a value set in a type field;
determining a transaction type of the ongoing query-response transaction based on the value set in the type field;
determining, based on the transaction type, that the query packet requests a response from any M nodes of a set of N targeted nodes wherein N is greater than or equal to M, and wherein the N targeted nodes include the first node;
determining whether to transmit or suppress a response packet based on the transaction type and the transaction identifier;
determining to suppress the response packet in response to determining that M response packets have been transmitted with the same transaction identifier by at least one other node of the N targeted nodes prior to the expiration of a wait timer in response to the query packet; and
transmitting the response packet to the second node in response to determining that M response packets have not yet been transmitted with the same transaction identifier by at least one other node prior to the expiration of the wait timer in response to the query packet, the response packet including the transaction identifier, wherein the size of a resource for the response packet transmitted by the first node is based on M.

2. The method of claim 1, wherein the determination whether to transmit the response packet is performed at at least one of a physical (PHY) layer, a media access control (MAC) layer, or a link layer.

3. The method of claim 1, wherein the query packet further includes an address of the first node and wherein the first node determines to transmit the response packet when the transaction type indicates the query packet requests a response from the node associated with the address.

4. The method of claim 1, wherein the query packet further includes an address associated with the N targeted nodes.

5. The method of claim 1, wherein M=N and the query packet requests a response from each of the N targeted nodes.

6. A method of communication at a first node, comprising:
receiving, at at least one of a physical (PHY) layer, a media access control (MAC) layer, or a link layer of the first node, a transaction type and data associated with the transaction type from an upper layer of the first node;
obtaining a transaction identifier for the data;
constructing, at the one of the PHY layer, the MAC layer, or the link layer, a query packet to include the transaction type, the data, a packet type, and the transaction identifier, wherein the packet type indicates that the query packet is a query, wherein the transaction type indicates that the query packet requests a response from any M nodes of a set of N targeted nodes wherein N is greater than or equal to M;
transmitting the query packet; and
determining whether M response packets have been received by the first node, wherein the first node requests an allocation of resources on a channel for transmission of the response packets, and wherein a size of the resources is based on the number of M response packets.

7. The method of claim 6, wherein the transaction identifier is obtained at the PHY layer, the MAC layer, or the link layer.

8. The method of claim 6, further comprising receiving at least one response packet in response to the query packet from at least one second node, each of the at least one response packet including the transaction identifier.

9. The method of claim 6, wherein M=N and the query packet requests a response from each of the N targeted nodes.

10. A method of communication at a first node, comprising:
receiving a query packet from a second node, wherein the query packet includes:
an indication of a first transaction with which the query packet is associated,
an indication that M response packets associated with the first transaction is requested by the second node, M being an integer greater than 0,
an indication of a time period allocated for transmitting the M response packets to the second node on a channel, the time period indicating a time duration for which the channel is reserved for transmitting the M response packets to the second node, and
an indication of at least one of a channel assignment mechanism or a contention mechanism to be used to allocate at least M time slots within the indicated time period;
obtaining a first time slot from the at least M time slots allocated in the indicated time period for accessing a channel in accordance with the indicated at least one of contention mechanism or channel assignment mechanism;
determining to suppress the response packet in response to determining that M response packets have been transmitted with the same transaction identifier by at least one other node prior to the expiration of the time duration in response to the query packet; and
transmitting, at the first time slot, a first response packet of the M response packets associated with the first transaction to the second node on the channel, wherein the size of a resource for the response packet transmitted by the first node is based on M.

11. The method of claim 10, wherein each of the M response packets include a respective distinguisher ID that distinguishes from the distinguisher IDs of the rest of the M response packets.

12. The method of claim 10, wherein the channel assignment mechanism is a spreading mechanism that spreads allocation of the at least M time slots, wherein the first time slot is obtained in accordance with the spreading mechanism.

13. The method of claim 10, wherein the first time slot is obtained in accordance with the contention mechanism through which the first node contends for a time slot of the at least M time slots with other nodes, wherein the method further comprises:
- detecting transmission of a second response packet of the M response packets associated with the first transaction to the second node from another node; and
- determining a time slot of the at least M time slots subsequent to the transmission of the second response packet in order to obtain the first time slot.

14. The method of claim 10, wherein the first time slot is obtained at a physical (PHY) layer, a media access control (MAC) layer, or a link layer.

15. The method of claim 10, further comprising determining that the channel is available in the first time slot.

16. An apparatus for communication, the apparatus being a first node, comprising:
- a memory; and
- at least one processor coupled to the memory and configured to:
  - receive a packet from a second node including type information indicating whether the received packet is a query packet or a response, and including a transaction identifier uniquely identifying an ongoing query-response transaction within a local neighborhood of the first and the second nodes;
  - determine that the received packet is a query packet based on a value set in a type field;
  - determine a transaction type of the ongoing query-response transaction based on the value set in the type field;
  - determine, based on the transaction type, that the query packet requests a response from any M nodes of a set of N targeted nodes wherein N is greater than or equal to M, and wherein the N targeted nodes include the first node;
  - determine whether to transmit or suppress a response packet based on the transaction type and the transaction identifier;
  - determine to suppress the response packet in response to determining that M response packets have been transmitted with the same transaction identifier by at least one other node prior to the expiration of a wait timer in response to the query packet; and
  - transmit the response packet to the second node in response to determining that M response packets have not yet been transmitted with the same transaction identifier by at least one other node prior to the expiration of the wait timer in response to the query packet, the response packet including the transaction identifier, wherein the size of a resource for the response packet transmitted by the first node is based on M.

17. The apparatus of claim 16, wherein the query packet further includes an address of the first node and wherein the at least one processor is further configured to determine to transmit the response packet when the transaction type indicates the query packet requests a response from the node associated with the address.

18. The apparatus of claim 16, wherein the query packet further includes an address associated with the N targeted nodes.

19. The apparatus of claim 16, wherein M=N and the query packet requests a response from each of the N targeted nodes.

* * * * *